United States Patent
Yamada

(10) Patent No.: US 11,632,293 B2
(45) Date of Patent: Apr. 18, 2023

(54) TAMPER-EVIDENCE PROCESSING BY COMPARING UPDATED OBJECTS OR BY COMPARING SUMMARIES THEREOF

(71) Applicant: Scalar, Inc., Tokyo (JP)

(72) Inventor: Hiroyuki Yamada, Kamakura (JP)

(73) Assignee: Scalar, Inc., Tokyo (JP)

( * ) Notice: Subject to any disclaimer, the term of this patent is extended or adjusted under 35 U.S.C. 154(b) by 0 days.

(21) Appl. No.: 17/424,846

(22) PCT Filed: Jan. 23, 2020

(86) PCT No.: PCT/JP2020/002421
§ 371 (c)(1),
(2) Date: Jul. 21, 2021

(87) PCT Pub. No.: WO2020/153454
PCT Pub. Date: Jul. 30, 2020

(65) Prior Publication Data
US 2022/0123991 A1    Apr. 21, 2022

(30) Foreign Application Priority Data

Jan. 23, 2019  (JP) .............................. JP2019-009558
Jan. 23, 2019  (JP) .............................. JP2019-009589
Nov. 18, 2019  (JP) .............................. JP2019-207634

(51) Int. Cl.
*H04L 41/0695*  (2022.01)
*H04L 41/082*   (2022.01)
*H04L 41/0659*  (2022.01)

(52) U.S. Cl.
CPC ...... *H04L 41/0695* (2013.01); *H04L 41/0659* (2013.01); *H04L 41/082* (2013.01)

(58) Field of Classification Search
CPC ............ H04L 41/0659; H04L 41/0695; H04L 41/082
(Continued)

(56) References Cited

U.S. PATENT DOCUMENTS 5,982,890 A    11/1999  Akatsu
10,475,034 B2 * 11/2019  Guise ................. G06Q 20/3278
(Continued)

OTHER PUBLICATIONS

Yamada et al., What's so Different about Blockchain?—Blockchain is a Probabilistic State Machine—, 2016 IEEE 36th International Conference on Distributed Computing Systems Workshops, pp. 168-175 (2016) (Year: 2016).*
(Continued)

*Primary Examiner* — David P Zarka
(74) *Attorney, Agent, or Firm* — Procopio, Cory, Hargreaves & Savitch LLP

(57) ABSTRACT

In each node system, a request execution unit executes, for each state update request, state update processing of updating an object representing a state of a target specified in the request, and returns a response indicative of completion of the request without executing tamper-evidence processing. The tamper-evidence execution unit executes tamper-evidence processing of detecting whether one or more common completion requests of one or a plurality of update completion requests are tampered with by comparing updated objects of two or more node systems or summaries thereof. The update completion request is a state update request for which the execution of the state update processing has been completed. The common completion request is an update completion request that is common among two or more node systems of the plurality of node systems.

6 Claims, 14 Drawing Sheets

(58) Field of Classification Search
USPC .......................................................... 709/224
See application file for complete search history.

(56) References Cited

U.S. PATENT DOCUMENTS

| | | | | |
|---|---|---|---|---|
| 10,515,391 | B2* | 12/2019 | Stephenson | ......... H04L 63/1441 |
| 2009/0022315 | A1* | 1/2009 | Leung | ................... H04L 9/3236 |
| | | | | 380/255 |
| 2016/0267273 | A1* | 9/2016 | Sugawara | ............. G06F 21/572 |
| 2018/0053182 | A1* | 2/2018 | Mokhasi | ............ G06Q 20/3829 |
| 2019/0103958 | A1* | 4/2019 | Wu | ......................... G06F 21/64 |
| 2020/0174968 | A1* | 6/2020 | Sreedhar | ............. G06F 21/6254 |

OTHER PUBLICATIONS

Sarmah, Understanding Blockchain Technology, Computer Science and Engineering 2018, pp. 23-29 (2018) (Year: 2018).*

Scalar DL: Scalable and Practical Byzantine Fault Detection for Transactional Database Systems, Proceedings of the VLDB Endowment, vol. 14, Issue 7 (Mar. 2022) (Year: 2022).*

Nakamoto, S., Bitcoin: A Peer-to-Peer Electronic Cash System, [online] 9 pgs., URL: https://bitcoin.org/bitcoin.pdf.

International Search Report for related PCT App No. PCT/JP2020/002421 dated Mar. 17, 2020, 5 pgs.

European Patent Office, Extended European Search Report, Application No. 20744251.8-1218, dated Sep. 23, 2022, in 9 pages.

* cited by examiner

TAMPER-EVIDENCE PROCESSING BY COMPARING UPDATED OBJECTS OR BY COMPARING SUMMARIES THEREOF

CROSS-REFERENCE TO RELATED APPLICATIONS

This application is a U.S. National Stage entry of PCT Application No: PCT/JP2020/002421 filed Jan. 23, 2020, which claims priority to Japanese Patent Application Nos. 2019-009558 filed Jan. 23, 2019, 2019-009589 filed Jan. 23, 2019, and 2019-207634 filed Nov. 18, 2019, the contents of which are incorporated herein by reference.

TECHNICAL FIELD

The present invention generally relates to a tamper-evidence technique.

BACKGROUND ART

A system to which a distributed ledger technology is applied is known as an example of a system with tamper-evidence, and blockchains are known as an example of a distributed ledger technology (e.g., NPL 1).

CITATION LIST

Non Patent Literature

SUMMARY OF INVENTION

Technical Problem

The term "target" as used in the following description refers to any tangible or intangible object. For example, the "target" can refer to an account and a state of the target can refer to a balance.

Further, the term "state update request" as used in the following description refers to a request for state update processing. The term "state update processing" refers to processing for updating the state of the target. The term "tamper-evidence processing" refers to processing of detecting whether or not an object is tampered with. The term "node system" refers to a component, of a server system and is also a system including one or more computers.

There are known many various BFT (Byzantine Fault Tolerance) consensus algorithms and similar mechanisms such as blockchains (e.g., HyperLedger fabric endorsement). According to such a mechanism, a plurality of node systems in the server system each manages, for each target, an object (data representing the state of the target). Each time the server system receives a state update request from a client system, each node system executes tamper-evidence processing of detecting whether or not an object is tampered with. In each node system, the "tamper-evidence processing" includes at least one of: detecting whether or not the current object (before the state update processing is executed) is tampered with; and detecting whether or not an updated object obtained by executing the state update processing halfway is tampered with. Similar tamper-evidence processing is executed in the plurality of node systems. If the execution of the tamper-evidence processing is not completed for all the node systems, none of the node systems can execute the state update processing. Further, even if any of the node systems successfully completes the execution of the state update processing first, none of the node systems can execute the state update processing for a next state update request relating to the state update request unless all the node systems complete the execution of the state update processing. This is because not all the node systems have an updated object, and therefore, ail the node systems may not complete the execution of the tamper-evidence processing for the next state update request.

Thus, it is desirable that the plurality of node systems have the same processing speed. This is because if the processing speeds of the plurality of node systems are different, it becomes necessary to wait for processing results from node systems having a relatively low processing speed, resulting in reduced utilization efficiency of the entire system.

Therefore, the flexibility of the server system configuration is low. For example, when a node system is added or exchanged, it is desirable that the node system to be added or exchanged be a node system having a processing speed identical or similar to that of other node systems deployed in the server system.

Such a problem makes it difficult to scale the server system, and therefore, causes a problem that it is difficult to ensure scalability.

This kind of problem may occur not only in data management systems to which a BFT consensus algorithm or a similar mechanism such as blockchains is applied, but also in general data management systems that compare processing results from a plurality of node systems to ensure tamper-evidence.

Solution to Problem

It is considered that, depending on the requirements of a data management system application, the tamper-evidence processing does not necessarily have to be executed immediately each time a state update request is received, and/or it is not necessary to execute the tamper-evidence processing for all state update requests. For example, for an application where the target is an account and the state of the target is a balance, the balance changes at both deposits and withdrawals, and however, depending on the requirements of the application, the tamper-evidence processing for the balance may have only to be executed for withdrawals and not have to be executed for deposits.

Accordingly, in the present invention, the execution of the state update processing and the execution of the tamper-evidence processing for objects of two or more node systems are separated from each other.

Specifically, a data management system includes one or a plurality of tamper-evidence execution units and a plurality of request execution units. The plurality of request execution units are included in a plurality of node systems of a second computer system that communicates with one or a plurality of first computer systems.

A request issuing unit included in the first computer systems issues a state update request in which a target is specified. In each of the node systems, the request execution unit executes, for each state update request, state update processing of updating an object that is data representing a state of the target specified in the state update request, and returns a response indicative of completion of the state update request without executing tamper-evidence processing. The tamper-evidence execution unit executes tamper-evidence processing of detecting whether or not a common completion request of one or a plurality of update completion requests is tampered with by comparing updated objects of two or more node systems of the plurality of node systems or summaries thereof. The update completion request is a state update request for which the execution of the state update processing has been completed. The common completion request is an update completion request that is common among two or more node systems of the plurality of node systems.

Note that the tamper-evidence execution unit may be a function included in the request issuing unit or a function not included in the request issuing unit. The tamper-evidence execution unit may be included in the first computer systems, the second computer system, and a system other than them.

Advantageous Effects of Invention

Since the execution of the state update processing and the execution of the tamper-evidence processing are separated, in each node system, the execution of the state update processing is completed for each state update request without the execution of the tamper-evidence processing. Thus, it is not necessary to configure the second computer system with a plurality of node systems having the same processing speed. Therefore, it is possible to increase the flexibility of the configuration of the second computer system, and as a result, also to enhance the scalability with high efficiency.

Further, since the execution of the state update processing and the execution of the tamper-evidence processing are separated, the state update processing is executed independently in each node system. When a response indicative of completion of the state update processing is returned from at least one of the node systems, the first computer system (e.g., a client system) can transmit a next related state update request. For the next state update request, the state update processing is also executed independently in each node system. Thus, for the first computer system, the latency in executing the state update processing is low.

Further, since the execution of the state update processing and the execution of the tamper-evidence processing are separated, the timing of the execution of the tamper-evidence processing can be flexibly determined, and/or a common completion request for which the tamper-evidence processing is to be executed can be flexibility selected. For example, for an application in which the target is an account and the state of the target is a balance, it is possible to perform setting for executing the tamper-evidence processing for balance not at the time of deposit but at the time of withdrawal.

DESCRIPTION OF EMBODIMENTS

Figure 1:
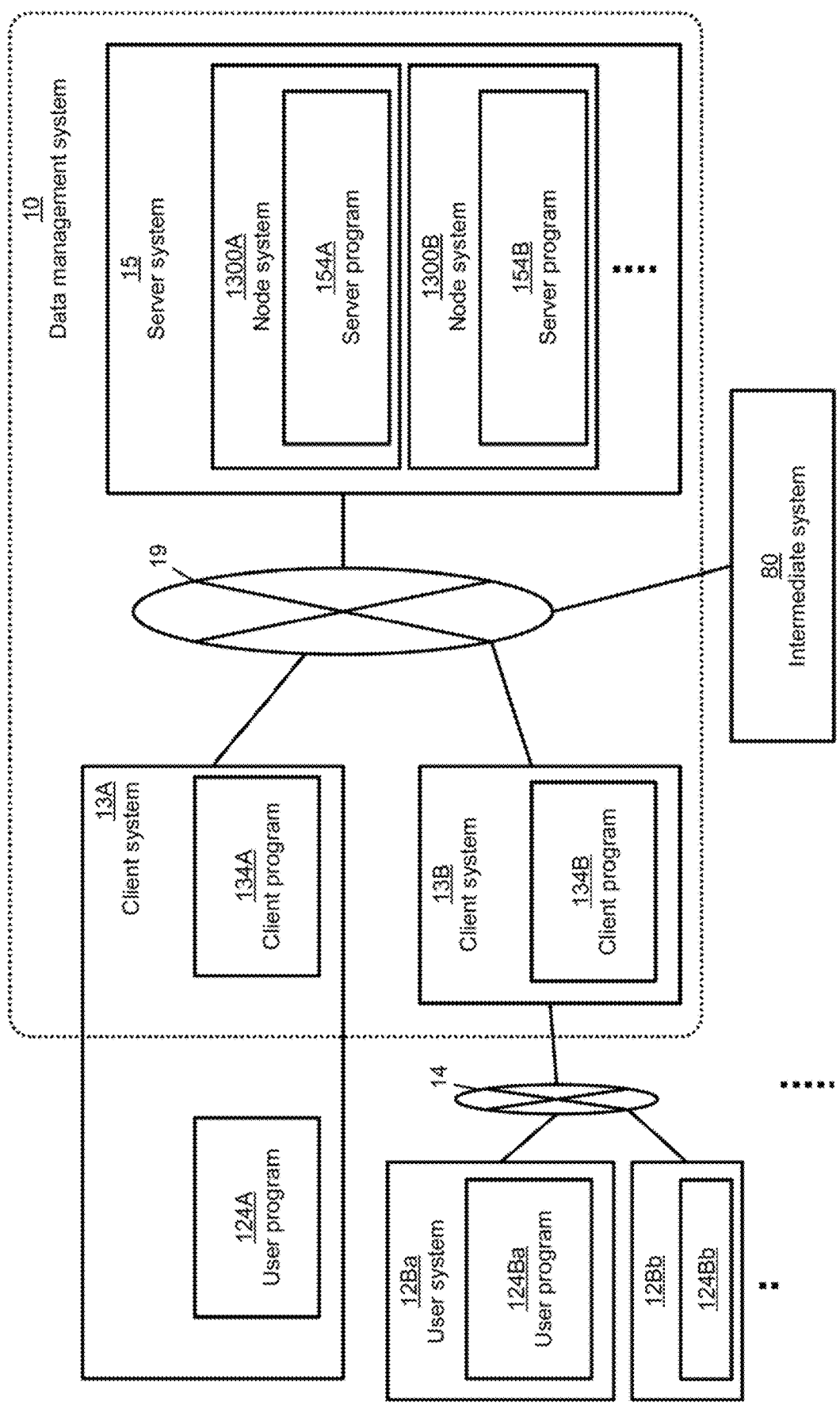
FIG. 1 illustrates an example of the configuration of the entire system according to a first embodiment.

In the following description, an "interface apparatus" includes one or more interfaces. The one or more interfaces may include one or more communication interface devices of the same type (e.g., one or more NICs (Network Interface Cards)) or may include two or more communication interface devices of different types (e.g., NIC and HBA (Host Bus Adapter)).

Further, in the following description, a "storage apparatus" includes one or more memories. For the storage apparatus, at least one memory may be a volatile memory. The storage apparatus is mainly used during processing by a processor. In addition to the memories, the storage apparatus may include one or more non-volatile storage devices (e.g., HDD (Hard Disk Drive) or SSD (Solid State Drive)).

Further, in the following description, a "processor" includes one or more processors. At least one of the processors is typically a microprocessor such as a CPU (Central Processing Unit). Each of the one or more processors may be of single-core or multi-core. The processor may include a hardware circuit that performs some or all processing.

Further, in the following description, processing is sometimes described with "program" as the subject, while the subject of the processing may be the processor in view of the fact that the program is executed by the processor to execute specified processing using, for example, a storage apparatus (e.g., memory) and/or an interface apparatus (e.g., a communication port) as appropriate. The processing described with the program as the subject may be processing executed by the processor or an apparatus including the processor. Further, the processor may include a hardware circuit (e.g., FPGA (Field-Programmable Gate Array) or ASIC (Application Specific Integrated Circuit)) that performs some or all processing. The program may be installed from a program source into an apparatus such as a computer. The program source may be, for example, a program distribution server or a computer-readable storage medium (e.g., a non-transitory storage medium). Further, in the following description, two or more programs may be implemented as one program, and one program may be implemented as two or more programs.

Further, in the following description, a function may be described by the expression of "yyy unit", but the function may be realized by a processor executing one or more computer programs, may be realized by one or more hardware circuits (e.g., FPGA or ASIC), or may be realized by a combination thereof. In a case where a function is realized by a processor executing the program(s), the function may be at least a part of the processor in view of the fact that specified processing is executed using a storage apparatus and/or an interface apparatus as appropriate. Processing described with a function as the subject may be processing executed by a processor or an apparatus including the processor. The description of each function is an example, and a plurality of functions may be combined into one function, or one function may be divided into a plurality of functions.

Further, in the following description, when the same type of components are described without being distinguished, a common part of reference characters may be used; when the same type of components are distinguished, full reference characters may be used.

Further, the term "object" as used in the following description refers to a block of logical electronic data in terms of a program such as an application program, and specifically, is data representing a state of a target. Data as an object is, for example, a record, a key-value pair, or a tuple. Hereinafter, a record is taken as an example as an object.

Further, the term "target" as used in the following description refers to any tangible or intangible object. For example, the "target" can refer to an account and a state of the target can refer to a balance.

Further, the term "state update request" as used in the following description refers to a request for state update processing. The term "state update processing" refers to processing for updating the state of the target.

First Embodiment

FIG. 1 illustrates an example of the configuration of the entire system according to a first embodiment.

A plurality of client systems 13A, 13B, . . . , and a server system 15 are communicably connected via a communication network 19. The server system 15 includes a plurality of node systems 1300A, 1300B, . . . . The plurality of client systems 13A, 13B, . . . are an example of one or more first computer systems. The server system 15 is an example of a second computer system. The node systems 1300 may be managed by different entities, and two or more (e.g., all) node systems 1300 may be managed by a common entity.

The client system 13 executes a client program 134. There may be a client system 13 (e.g., the client system 13A) that executes not only the client program 134 but also a user program 124, or there may be a client system 13 (e.g., the client system 13B) that is connected via a communication network 14 to a user system 12 that executes a user program 124. The user system 12 may be a user's computer (e.g., a personal computer). The user program 124 may be a Web browser or an application program. The communication network 14 may be integrated with the communication network 19.

A data management system 10 includes a plurality of client programs 134 executed in the plurality of client systems 13A, 13B, . . . , and a server program 154 executed by the node system 1300.

An intermediate system 80 is connected to the communication network 19. The intermediate system 80 is a computer system intervening between the plurality of client systems 13A, 13B, . . . , and the plurality of node systems 1300A, 1300B, . . . . The intermediate system 80 includes an ordering system. The ordering system is composed of one or more partitions, and is a system that guarantees total ordering for each partition. In the present embodiment, the ordering system is composed of one partition.

A plurality of state update requests from the plurality of client systems 13A, 23B, . . . is input to the intermediate system 30 and then output from the intermediate system 80. The communication network connecting the plurality of client systems 13A, 13B, . . . and the intermediate system 80 may be the same as or different from the communication network connecting the intermediate system 80 and the plurality of node systems 1300A, 1300B, . . . .

Figure 2:
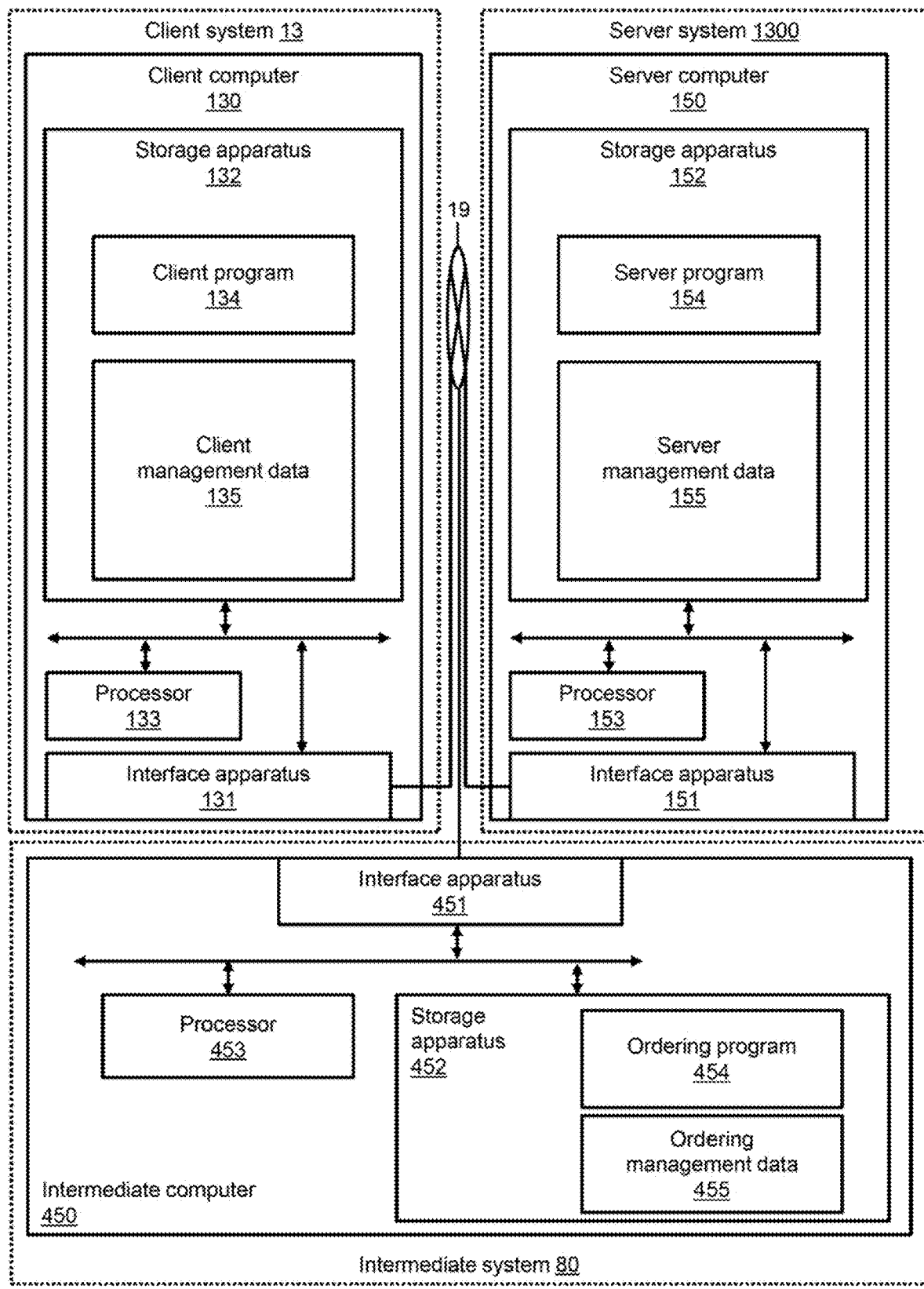
FIG. 2 illustrates an example of the configuration of a client system, a node system, and an intermediate system.

FIG. 2 illustrates an example of the configuration of the client system 13, the node system 1300, and the intermediate system 30.

The client system 13 includes one or more client computers 130.

The client computer 130 includes an interface apparatus 131, a storage apparatus 132, and a processor 133 connected to them.

The interface apparatus 131 is connected to the communication network 19.

The storage apparatus 132 stores the client program 134 and client management data 135. The client management data 135 is data managed by the client computer 130.

The processor 133 executes the client program 134. The client program 134 is executed by the processor 133 to realize a function as an example of a request issuing unit. A part of the function may be realized by a hardware circuit such as FPGA or ASIC.

The node system 1300 includes one or more server computers 150 (an example of node computers).

The server computer 150 includes an interface apparatus 151, a storage apparatus 152, and a processor 153 connected to them.

The interface apparatus 151 is connected to the communication network 19.

The storage apparatus 152 stores the server program 154 and server management data 155. The server management data 155 is data managed by the server computer 150.

The processor 153 executes the server program 154. The server program 154 is executed by the processor 153 to realize a function as an example of a request execution unit. A part of the function may be realized by a hardware circuit such as FPGA or ASIC.

The intermediate system 80 includes one or more intermediate computers 45 (e.g., redundant computers).

The intermediate computer 45 includes an interface apparatus 451, a storage apparatus 452, and a processor 453 connected to them.

The interface apparatus 451 is connected to the communication network 19.

The storage apparatus 452 stores an ordering program 454 and ordering management data 455. The ordering management data 455 is data managed by the intermediate computer 45.

The processor 453 executes the ordering program 454. The ordering program 454 is executed by the processor 453 to realize a function as an example of an ordering management unit. A part of the function may be realized by a hardware circuit such as FPGA or ASIC. The ordering program 454 stores a state update request from the client system 13 in the ordering system.

The intermediate system 80 is preferably managed by, but not limited to, an entity different from that for any node system 1300. For example, any server computer 150 in any node system 1300 may serve as the intermediate computer 45.

Figure 3:
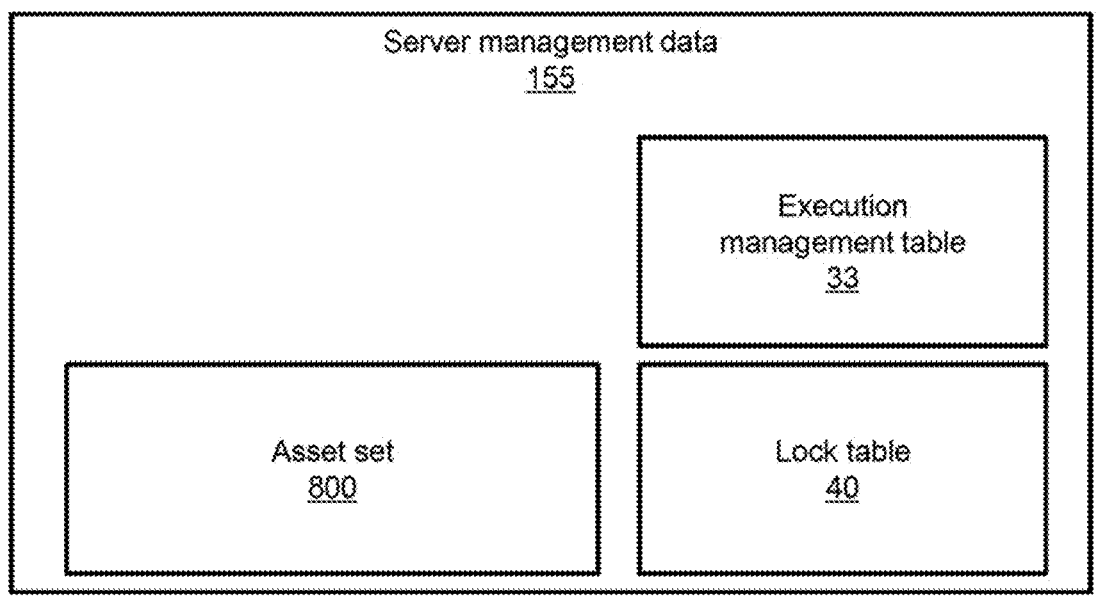
FIG. 3 illustrates an example of server management data.

FIG. 3 illustrates an example of server management data 155.

The server management data 155 is an execution management table 33, a lock table 44, and an asset set 800.

The execution management table 33 is a table (e.g., a list of nonces in executed state update requests) representing the executed state update requests.

The lock table 44 is a table used for determining whether or not a lock can be acquired, and is also a table showing which state update request and which target a lock has been acquired.

The asset set 800 is a set of assets.

Figure 4:
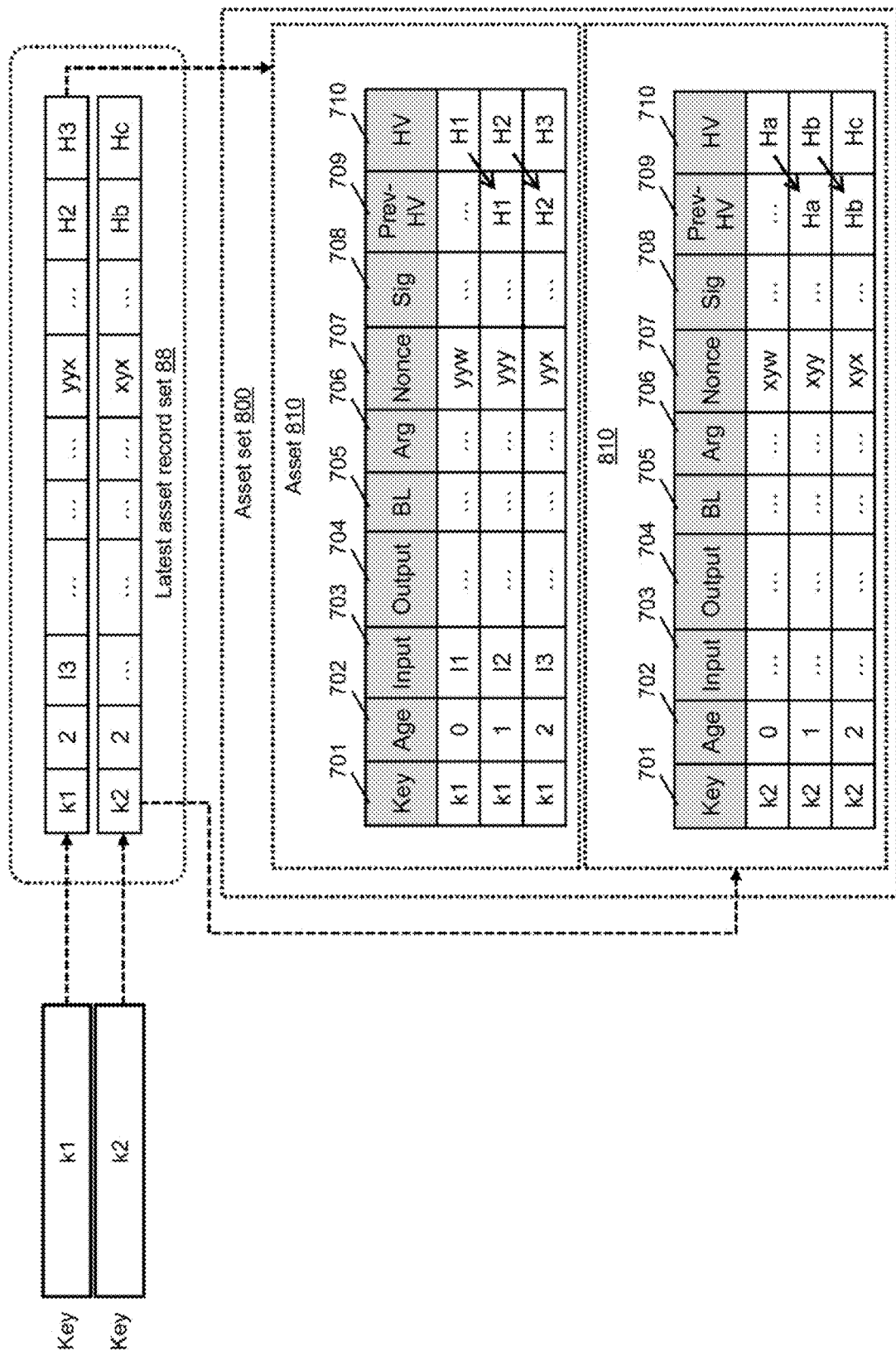
FIG. 4 illustrates an example of an asset set.

FIG. 4 illustrates an example of the asset set 800.

The asset set 800 has an asset 810 for each target. The asset 810 for a target is identified from the key of the target. For each target, the asset 810 may correspond to a ledger.

For each target, the asset 810 is a time series of records. Each record in the asset 810 may be referred to as an "asset record". The asset 810 has at least a terminal asset record. The asset record has information such as a key 701, an age 702, an input 703, an output 704, a BL 705, an Arg 706, a nonce 707, a Sig 708, a Prev-HV 709, and an HV 710. Hereinafter, one target and one asset record will be taken as an example ("target of interest" and "asset record of interest" for the description of FIG. 4).

The key 701 is the ID of the target of interest. The age 702 represents the generation of a state of the target of interest. Each time the state of the target of interest is updated, a terminal asset record with an incremented age 702 is added. In the present embodiment, a newer generation means a higher age 702.

The input 703 represents the pre-state of each of one or more targets including the target of interest (a state immediately before the BL 705 in the asset record of interest is applied). The output 704 represents the post-state of the target of interest (a state immediately after the BL 705 in the asset record of interest is applied). For example, in a case where state update processing in which the asset record of interest is to be added is a transfer from account A (an example of the target of interest) to account B, the input 703 represents balances of account A and account B immediately before the transfer. The output 704 represents a balance of account A immediately after the transfer.

The BL 705 is logic information for identifying a processing logic (e.g., a function) of the state update processing. The logic information is the processing logic itself in the present embodiment, but instead, it may be the ID of the processing logic.

The Arg 706 is argument information which is one or more arguments used in the corresponding processing logic.

The i-th XXX is expressed as $XXX_i$. For example, $output_i$ is expressed as $output_i = BL_i (input_i, Arg_i)$. In other words, $output_i$ is a result of executing $BL_i$ using $input_i$ and $Arg_i$. Note that the input 703 provides a record chain between targets (between assets 810) (see the dashed line arrows in FIG. 4).

The nonce 707 is a nonce corresponding to the latest state (output 704) of the target of interest. Specifically, the nonce 707 is a nonce associated with a state update request for state update processing in which the latest state is obtained.

The Sig 708 is an electronic signature created by using a private key of a user who issued the state update request in which the latest state (output 704) of the target of interest is obtained. The Sig 708 is created on the basis of the BL 705, Arg 706, and nonce 707 in the present embodiment. Note that an electronic signature created on the basis of the BL 705, an electronic signature created on the basis of the Arg 706, and an electronic signature created on the basis of the nonce 707 may be separate.

The Prev-HV 709 has the same value as the HV 710 of the asset record (i.e., the parent asset record) in the pre-state (previous generation) of the target of interest. That is, a link between the HV 710 in the parent asset record and the Prev-HV 709 (see the solid arrow in FIG. 4) provides a record chain in the asset 810 for the target.

The HV 710 is a summary of an asset record of the target of interest, for example, a hash value (hash value in which cryptographic collision is difficult) of at least part of information other than the HV 710 (all information 701 to 709 in the present embodiment).

As described above, in the asset set 800, a record chain is provided between the Prev-HV 709 and the HV 710 in asset records of the same asset 810 (see the solid line arrow). A record chain may be provided between the inputs 703 in asset records of different assets 810. In this way, the asset set 800 has a DAG (Directed Acyclic Graph) structure. In the asset set 800, a node is an asset record and an edge represents a relationship between asset records in one or more state update processing.

For each target, the asset 810 is an example of a history of updates of a state of the target. The schema for the asset record is not limited. For example, some elements (e.g., BL 705 or Sig 708) may not be present in the asset record.

The server program 154 may manage a latest asset record set 88 in addition to or in place of the asset set 800. The latest asset record set 88 has a latest asset record (only the terminal asset record) for each target. In other words, for each object, the latest state has only to be managed, and the past state may not be managed.

Figure 5:
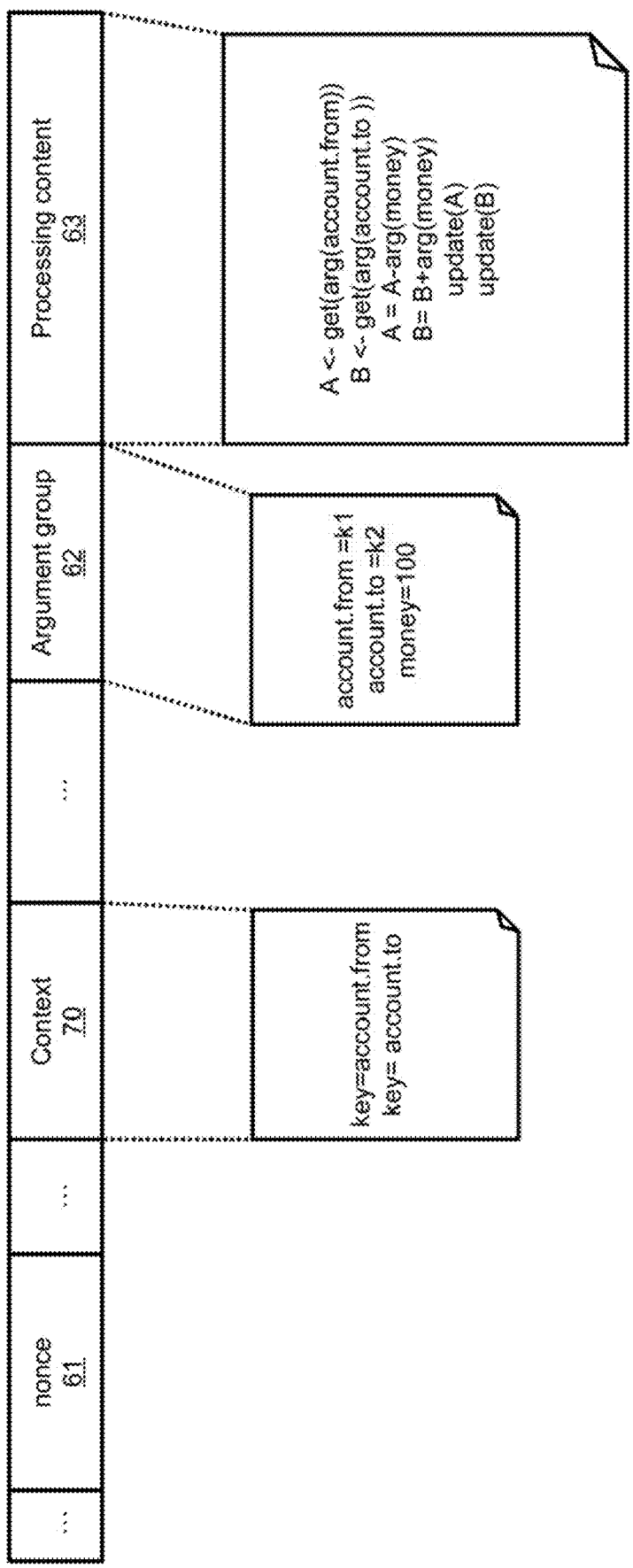
FIG. 5 illustrates the outline of the structure of a state update request.

FIG. 5 illustrates the outline of the structure of the state update request.

The state update request is issued by the client program 134. The client program 134 creates, for example, a state update request including information (e.g., information including one or more arguments including a target key) received from the user program 124 (e.g., an application program), and issues the created state update request.

The state update request includes a nonce 61, an argument group 62, and processing content 63.

The argument group 62 includes one or more arguments. Each argument in the argument group 62 is associated with an argument key (e.g., "account.from", "account.to", or "money"). According to the example of FIG. 5, the argument key is a label for an argument and is explicitly represented in the argument group 62. However, the argument key may be implicitly represented. For example, the argument key may be an offset from the beginning of the argument group 62.

The processing content 63 is a processing description (or a link to the processing description) that is a description representing the content of the state update processing using the argument group 62. In the processing description, for steps using arguments in the state update processing, argument keys for the arguments are defined. In executing the state update processing, the arguments corresponding to the argument keys are used.

The argument group 62 includes arguments representing specified targets. In the present embodiment, when a target key specified in a state update request before execution conflicts with a target key specified in a state update request being executed, this means that those state update requests are in conflict. When two or more conflicting state update requests are executed in parallel in each node system 1300 and the order of executing the two or more state update requests is different between the node systems 1300, the latest asset records of the same target may not be the same between the node systems 1300. Thus, two or more conflicting state update requests need to be executed in a determinate order in each node system 1300. To this end, one method is to determine whether or not a target key specified in a state update request conflicts with a target key specified in a state update request being executed.

However, the argument group 62 does not indicate which argument key is the target key. Therefore, it is not possible to identify which argument key is the target key unless the state update request is executed.

Therefore, in the present embodiment, a context 70 is added to the state update request. The context 70 is information for conflict determination, and is also a description for identifying one or more target keys. Specifically, for example, the context 70 is a direct or indirect reference to one or more target keys. According to the example illustrated in FIG. 5, the context 70 is an indirect reference to one or more target keys. Specifically, the context 70 is a description for identifying one or more target keys through the argument group 62, and is more specifically information representing which argument corresponding to an argument key in the argument group 62 is the target key. From the context 70 illustrated in FIG. 5, it can be seen that "account.from" and "account.to" are the argument keys corresponding to the target keys, and from the argument group 62, it can be seen that the argument "k1" corresponding to the argument key "account.from" and the argument "k2" corresponding to the argument key "account.to" are the target keys. It is possible to perform a conflict determination for determining whether or not the target key thus identified from the state update request conflicts with the target key specified in the state update request being executed.

Note that the context 70 may be a direct reference to one or more target keys, as described above. For example, the context 70 may be a description that directly indicates that "k1" and "k2" are the target keys (e.g., "key=[k1, k2]"). According to such a description, one or more target keys can be identified without referring to a description other than the context 70 (e.g., the argument group 62).

Figure 6:
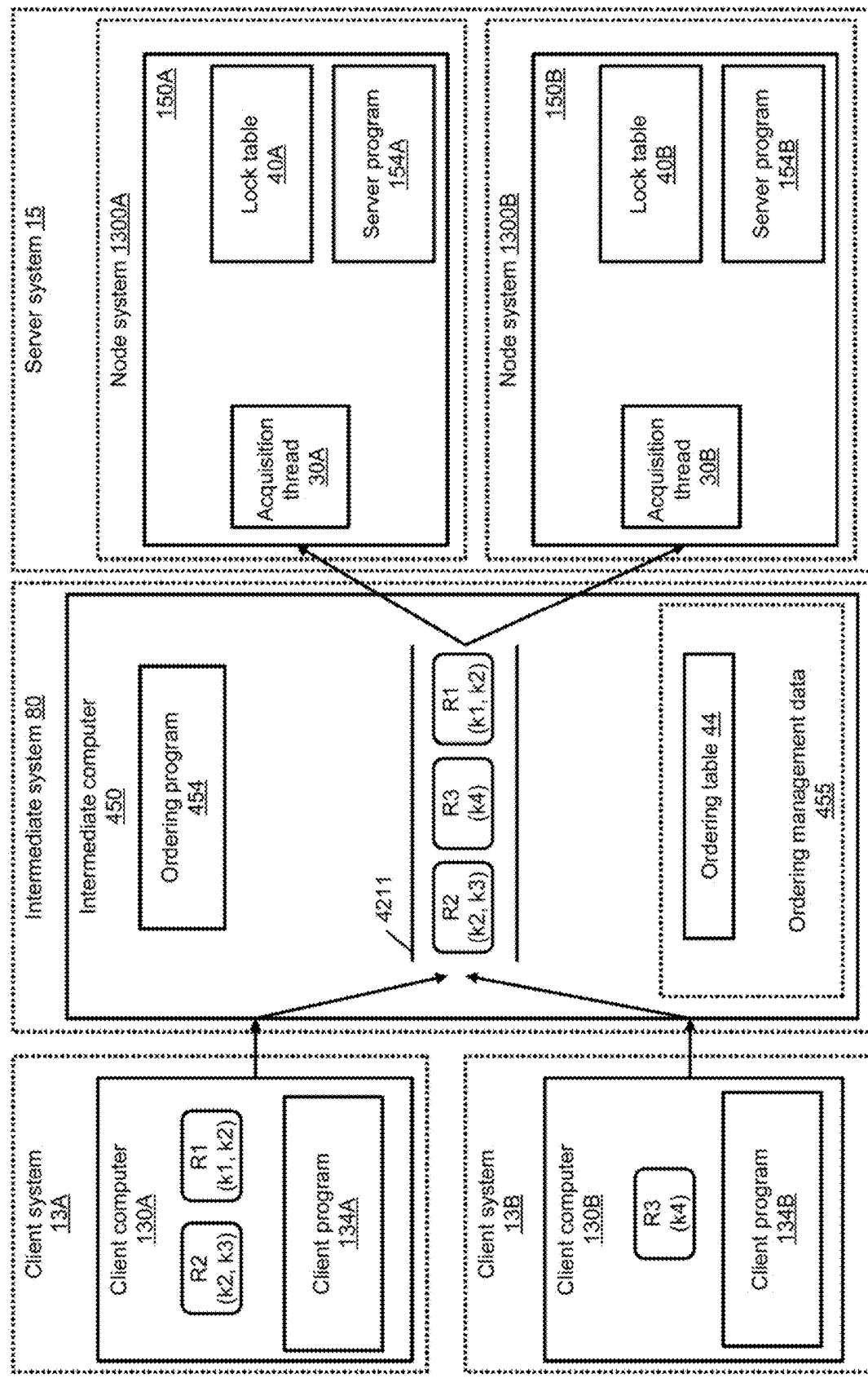
FIG. 6 illustrates the outline of the first embodiment.

FIG. 6 illustrates the outline of the first embodiment. Note that, in FIG. 6, "R" in "Rx" (x is a natural number) represents a state update request, and "x" represents the number of the state update request (e.g., a number corresponding to its nonce). Further, in FIG. 6, "ky" (y is a natural number) represents a target key whose value determined on the basis of the target key is y (y is a natural number).

An ordering program 454 receives a state update request from a client system 13 (a client program 134), and inputs the received state update request to an ordering system 4211. Each time a state update request is received, the state update request may be input to the ordering system 4211, or each time a certain amount of time elapses or a certain number of state update requests are received, the received one or more state update requests may be input to the ordering system 4211 in order according to a predetermined rule.

There are provided a request reception unit that is a function of receiving a state update request output from the ordering system 4211; and a conflict determination unit that is a function of determining whether or not the state update request received by the request reception unit conflicts with a state update request being executed. Both the request reception unit and the conflict determination unit are included in at least one computer system. In the present embodiment, both the request reception unit and the conflict determination unit are included in each node system 1300, but at least one of the request reception unit and the conflict determination unit may be included in a computer system other than the node systems 1300. For example, in a computer system (not illustrated) intervening between the intermediate system 80 and the server system 15, one or more request reception units (e.g., one or more request reception units for each node system 1300) may be included, or one or more conflict determination units (e.g., one or more conflict determination units for each node system 1300) may be included.

An acquisition thread 30 is executed in each node system 1300. The acquisition thread 30 acquires a state update request from the ordering system 4211 and performs the above-mentioned conflict determination for the state update request. In the present embodiment, the acquisition thread 30 corresponds to the request reception unit and the conflict determination unit. In the present embodiment, one acquisition thread 30 is prepared in advance in each node system 1300. However, in each node system 1300, two or more acquisition threads 30 may be prepared in advance, or the acquisition thread 30 may be dynamically created. The request reception unit and the conflict determination unit may be implemented in separate threads. The request reception unit and the conflict determination unit may be, instead of the thread, a process, the server computer 150 in the node system 1300, or an element (e.g., a thread, a process, or a computer) in a system other than the node system 1300.

In each node system 1300, the acquisition thread 30 receives the state update request output from the ordering system 4211. The state update request reaches the acquisition thread 30 from the ordering system 4211 by being either pulled by the acquisition thread 30 or pushed by the ordering program 454. In the present embodiment, pull is adopted. Specifically, the acquisition thread 30 acquires the state update request from the ordering system 4211. Note that the state update request may be transmitted from the ordering system 4211 to the node system 1300 by at-least-once delivery transmission. For one state update request entered in the ordering system, "at-least-once delivery transmission" means that the one state update request can be retrieved at least once.

In each node system 1300, the acquisition thread 30 determines whether or not the acquired state update request conflicts with the state update request being executed in the node system 1300. Specifically, the acquisition thread 30 identifies one or more target keys from the context 70 of the acquired state update request, and locks the identified one or more target keys in a determinate order. This makes it possible to avoid the deadlock of the target key. Note that, in the present embodiment, locking the target key means registering the number of the state update request (e.g., nonce) and the target key specified in the state update request in the lock table 44 (the target key is used as a key). The "determinate order" is a predetermined order common among all node systems 1300, and may be, for example, in ascending order of the first characters of target keys.

If at least one target key is not locked (e.g., if at least one target key is already registered in the lock table 44), there is a conflict with the state update request being executed. In this case, the acquisition thread 30 waits for the locked target key to be unlocked (e.g., the target key is deleted from the lock table 44).

If all target keys are locked, it means that there is no conflict with the state update request being executed. In this case, the acquisition thread 30 creates another thread (hereinafter, request thread). The acquisition thread 30 acquires the next state update request without waiting for the processing of the request thread. The created request thread requests the server program 154 to execute the state update request. The server program 154 is configured to be able to execute a plurality of state update requests in parallel. When the server program 154 receives an execution request for a state update request, the server program 154 executes the state update request associated with the execution request regardless of whether or not there is a state update request being executed (in other words, even if there are one or more state update requests being executed). When the execution of the state update request is completed, the server program 154 returns a completion response (a response indicating the completion of execution of the state update request) to the issuer of the state update request whose execution is completed. The request thread unlocks all target keys that have been locked in the completed state update request.

In executing the state update request, the server program 154 adds an asset record to the asset 810 for each specified target key. When the latest asset record set 88 (see FIG. 4) is adopted instead of the asset set 800, the server program 154 updates, for each specified target key, the asset record corresponding to the target key.

In the intermediate system 80, the ordering management data 455 includes an ordering table 44. A commit offset is registered in the ordering table 44 for each node system 1300.

For each node system 1300, the commit offset represents the position of the state update request whose execution has been completed in the node system 1300. When the execution of the state update request is completed in the node system 1300, the ordering program 454 receives the completion of acquisition of the state update request from the node system 1300. When receiving the completion of acquisition, the ordering program 454 registers information indicating the commit offset in the ordering table 44 for the corresponding node system 1300.

In a case where the intermediate system 80 includes a plurality of intermediate computers 450, the intermediate system 80 has one logical ordering system having a consistency equal to or higher than the sequential consistency (replication of the ordering system deployed in each of the plurality of intermediate computers 450). When the state of the ordering system of any of the intermediate computers 450 is updated, the ordering system whose state has been updated is reflected in all the other ordering systems, and as a result, the states of the plurality of ordering systems become the same.

The details of processing executed in the first embodiment will be described below with reference to FIG. 7. Note that, in the description with reference to FIG. 7, the node system 1300A will be taken as an example. Further, in the following description, it is assumed that the context 70 is added by the client program 134.

Figure 7:
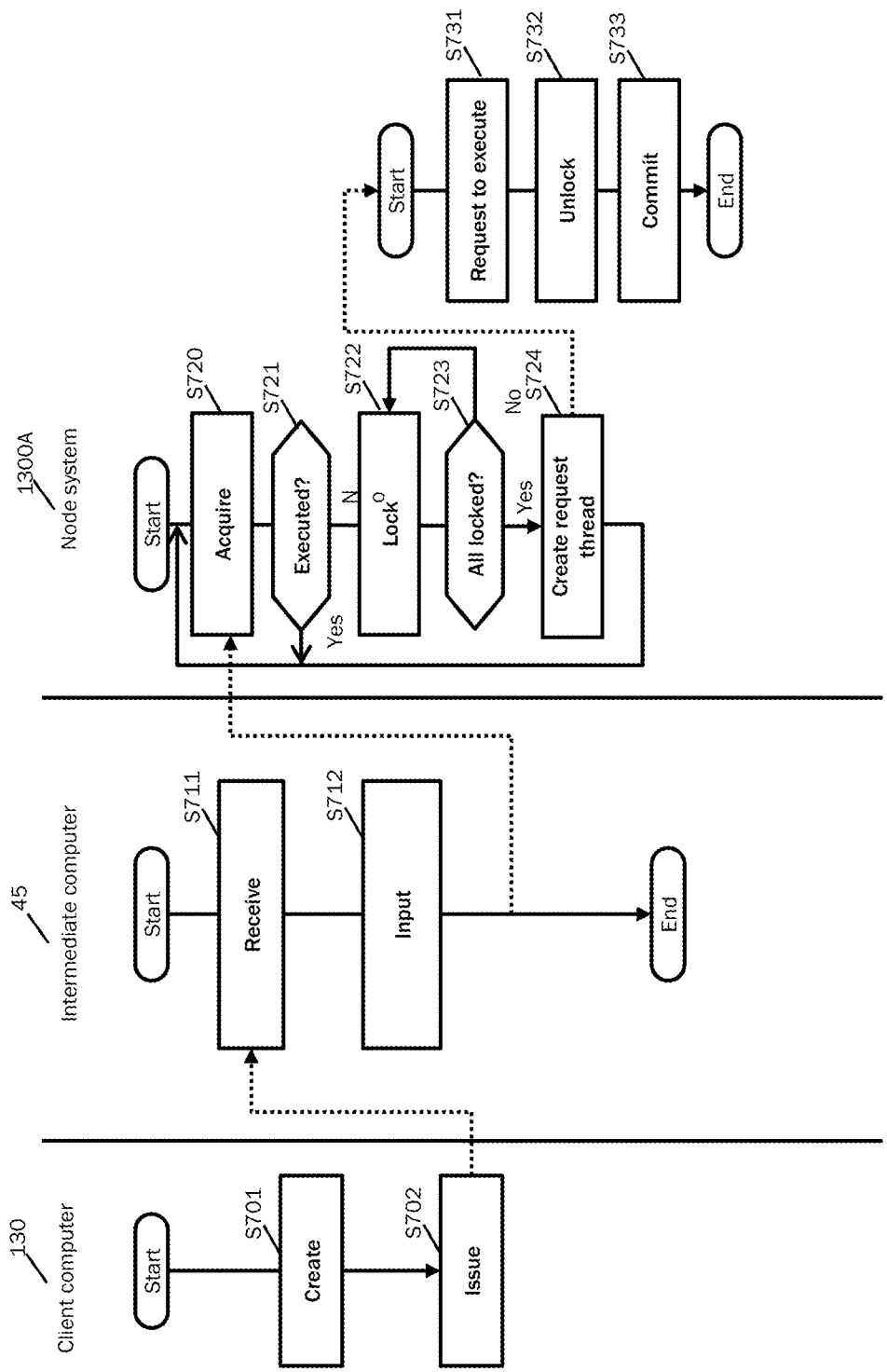
FIG. 7 is a flowchart illustrating a flow from the creation of a state update request to the completion of execution in the first embodiment.

FIG. 7 is a flowchart illustrating a flow from the creation of a state update request to the completion of execution in the first embodiment.

In S701, the client program 134 receives one or more target keys from the user program 124 and creates a state update request. The created state update request includes the context 70 added by the client program 134. The context 70 includes a description for identifying the target key(s) specified from the user program 124.

In S702, the client program 134 issues the state update request.

In S711, the ordering program 454 receives the issued state update request. In S712, the ordering program 454 inputs the received state update request to the ordering system 4211.

In S720, an acquisition thread 30A in the node system 1300A acquires the state update request from the ordering system 4211. Specifically, the acquisition thread 30A transmits an acquisition request to the intermediate system 80. In response to the acquisition request from the acquisition thread 30A, the ordering program 454 outputs, to the acquisition thread 30A, a state update request to be output (a state update request at the position next to the position represented by a commit offset corresponding to the node system 1300A) in the ordering system 4211.

In S721, the acquisition thread 30A refers to the execution management table 33 to determine whether or not the acquired state update request has been executed. If the same nonce as the nonce in the acquired state update request is not registered in the execution management table 33, the state update request is still not executed.

If the determination result of S721 is false (S721: No), in S722, the acquisition thread 30A identifies one or more specified target keys from the context 70 of the acquired state update request, sorts the one or more target keys in a determinate order, and locks the target keys in that order.

In S723, the acquisition thread 30A determines whether or not all the target keys have been locked. If at least one target key is not locked (S723: No), the acquisition thread 30A waits for the unlocked target key to be unlocked, and then locks, when that target key is unlocked, the unlocked target (S722).

If all the target keys are locked (S723: Yes), the acquisition thread 30A creates a request thread in S724. After that, the acquisition thread 30A becomes in a state in which the state update request can be acquired. Note that a plurality of request threads may be prepared in advance.

In S731, the created request thread requests a server program 154A to execute the state update request in which all the target keys are locked. In response to that request, the server program 154A executes the state update request. In executing the state update request, the server program 154A performs, through an atomic operation, updating the asset 810 for each locked target key (e.g., adding an asset record); and writing to the execution management table 33 the number of the state update request (e.g., nonce) as a primary key, for example. When the execution of the state update request is completed, the server program 154A returns a response indicative of the completion of state update request to the issuer of the state update request.

In S732, the request thread unlocks all the target keys locked in S722.

In S733, the request thread makes a commit, specifically, notifies the intermediate system 80 of the completion of the state update request. In response to that notification, the ordering program 454 updates the ordering table 44 for the node system 1300A. Specifically, the ordering program 454 sets an offset representing the position of the state update request as a commit offset.

According to the first embodiment, the context 70, which is a description for identifying one or more target keys, is added to the state update request. In each node system 1300, the acquisition thread 30 identifies the target key specified in the state update request from the context 70, and determines whether or not the identified target key conflicts with the target key specified in the state update request being executed. If there is no conflict, the acquisition thread 30 creates a request thread and then becomes in a state where the state update request can be acquired. Specifically, each time the acquisition thread 30 acquires a state update request and determines that there is no conflict with respect to the state update request, the acquisition thread 30 creates a request thread. The created request thread requests the server program 154 to execute the state update request. When the server program 154 receives that request, the server program 154 executes the requested state update request even when there is a state update request being executed. In this way, two or more state update requests without conflict can be executed in parallel in each node system 1300, and as a result, the availability of each node system 1300 can be improved while the same asset record can be obtained in the plurality of node systems 1300.

Second Embodiment

A second embodiment will be described. In the following description, differences from the first embodiment will be mainly focused, and the description of the common points with the first embodiment will be simplified or omitted.

FIG. 3 illustrates the outline of the second embodiment.

The ordering system 4211 is composed of a plurality of partitions 4311. In the ordering table 44, for example, a partition ID and a partition position are registered for each partition 4311. Further, a commit offset is registered in the ordering table 44 for each partition 4311. Note that, although total ordering is guaranteed for each partition 4311, total ordering between the plurality of partitions 4311 is not guaranteed. For example, even when a first state update request is input to a partition 4311-2 and then a second state update request is input to a partition 4311-2, the first state update request is not always output from the partition 4311-1 prior to the second state update request.

Figure 8:
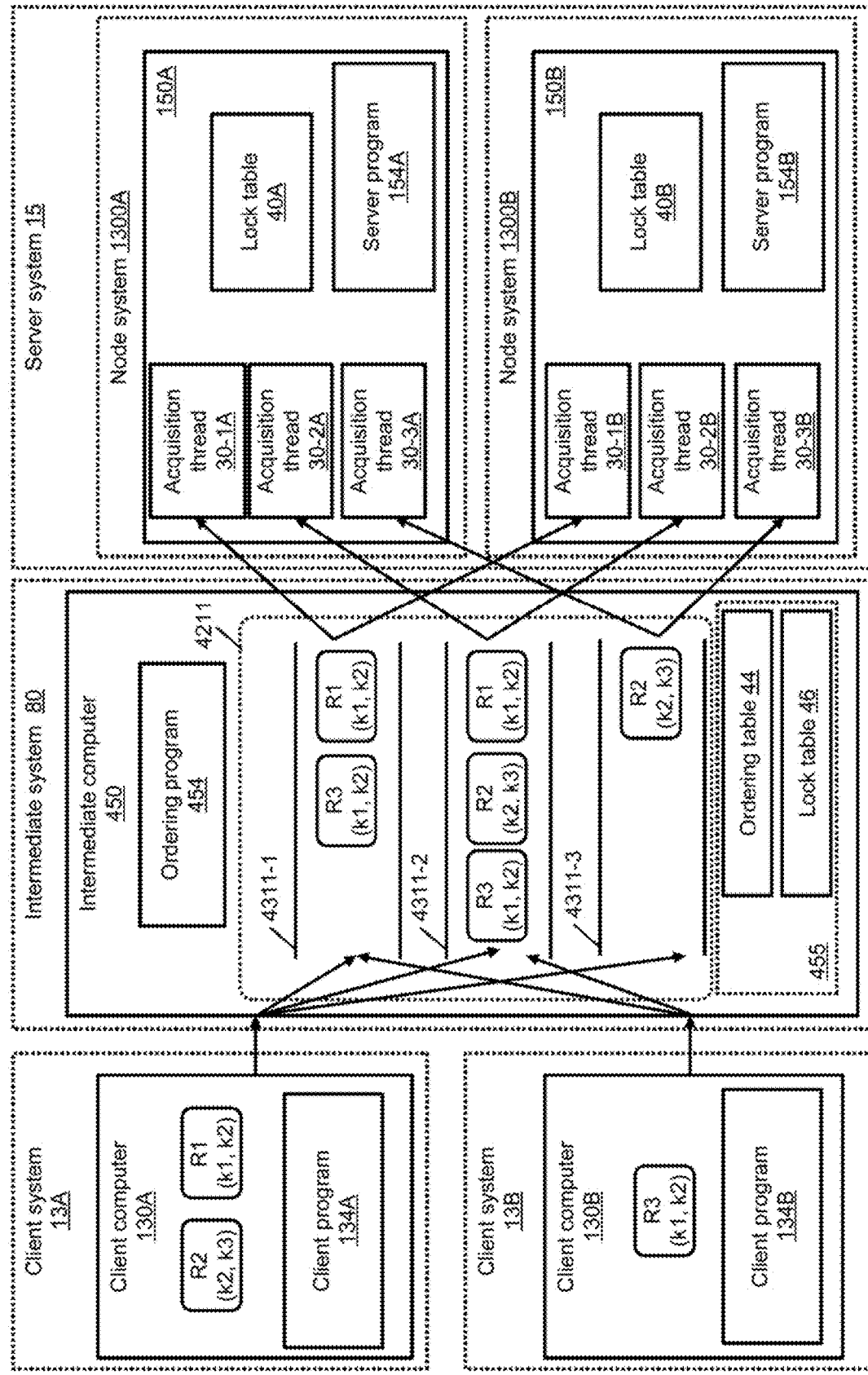
FIG. 8 illustrates the outline of a second embodiment.

Hereinafter, a value determined on the basis of a target key is referred to as "key value" for convenience, and a target key whose key value is N (N is a natural number) is expressed as "keyN". One partition 4311 corresponds to one target key. The target keys and the partitions 4311 may have a 1:1 correspondence, a range of continuous key values (e.g., N=1 to 10, N=11 to 20) and the partitions may have a 1:1 correspondence, or a range of discrete key values (e.g., N=odd, N=even) and the partitions may have a 1:1 correspondence. For example, the partition 4311 may be uniquely determined from a value calculated using a key value (e.g., the remainder obtained by dividing the key value by the number of partitions 4311). According to the example of FIG. 8, target keys (k1, k4, k7, . . . ) whose key value when divided by 3 (the number of partitions) gives a remainder of 1 corresponds to the partition 4311-1, target keys (k2, k5, k8, . . . ) whose key value when divided by 3 gives a remainder of 2 corresponds to the partition 4311-2, and target keys (k3, k6, k9, . . . ) whose key value when divided by 3 gives a remainder of 0 corresponds to a partition 4311-3. When a plurality of target keys are specified in a state update request, the state update request may be input to one partition 4311 or may be input to a plurality of partitions 4311. When a plurality of target keys are specified in a state update request, the ordering program 454 copies the state update request for each target key and inputs the copied state update request to the partition 4311 corresponding to that target key. However, when two or more target keys correspond to the same partition 4311, the ordering program 454 inputs one state update request to one partition 4311 corresponding to the two or more target keys. Specifically, for example, when the target keys specified in a state update request are k1 and k4, both k1 and k4 correspond to the partition 4311-1, so that the input destination of the state update request is one partition 4311-1. Further, for example, when the target keys specified in a state update request are k1 and k2, k1 corresponds to the partition 4311-1 and k2 corresponds to the partition 4311-2, so that the input destination of the state update request is the two partitions 4311-1 and 4311-2.

When a plurality of target keys are specified in a state update request, the ordering program 454 locks the plurality of target keys in a determinate order, and then inputs the state update request to one or more partitions 4311 corresponding to the plurality of target keys. For example, the ordering program 454 locks k1 and k2 in a determinate order, and then inputs the state update request in which k1 and k2 are specified to the partitions 4311-1 and 4311-2. Such processing makes it possible to avoid that the order of two or more conflicting state update requests (e.g., R1 and R3) is different between partitions 4311, in other words, to maintain the order of two or more conflicting state update requests in a determinate order. Note that, in the present embodiment, locking a target key means registering the number of a state update request (e.g., nonce) and the target key in a lock table 46 in the ordering management data 455 (the target key is a key).

In each node system 1300, the acquisition thread 30 acquires a state update request from some partitions 4311 (one or more partitions 4311). According to the example of FIG. 8, for each node system 1300, the partitions 4311 and the acquisition threads 30 have a 1:1 correspondence. Specifically, an acquisition thread 30-1 corresponds to the partition 4311-1, an acquisition thread 30-2 corresponds to the partition 4311-2, and an acquisition thread 30-3 corresponds to the partition 4311-3. Each acquisition thread 30 acquires a state update request from the partition 4311 corresponding to the acquisition thread 30. When two or more target keys have been acquired in the acquired state update request and the two or more target keys correspond to two or more partitions 4311, each acquisition thread 30 locks the two or more target keys and then executes the state update request. Two or more target keys corresponding to two or more partitions 4311 may be locked by two or more acquisition threads 30 corresponding to the two or more partitions 4311, or may be locked in a determinate order by any one of the two or more acquisition threads 30. An example of the former is the following (X), and an example of the latter is the following (Y). In the present embodiment, (X) is adopted. (X) The acquisition thread 30 locks one or more target keys corresponding to the partition 4311 corresponding to the acquisition thread 30 among two or more target keys. When all of the two or more target keys specified in a state update request are locked, the acquisition thread 30 requests the server program 154 to execute the state update request. For example, when an acquisition thread 30-1A acquires R1 (k1, k2) from the partition 4311-1, the acquisition thread 30-1A locks k1 corresponding to the partition 4311-1. However, since k2 is not locked yet, the acquisition thread 30-1A does not request the server program 154 to execute R1 (k1, k2). After that, when an acquisition thread 30-2A acquires R1 (k1, k2) from the partition 4311-2, the acquisition thread 30-2A locks k2 corresponding to the partition 4311-2. As a result, all of k1 and k2 are locked, and accordingly, the acquisition thread 30-2A requests the server program 154A to execute R1 (k1, k2). When the execution of R1 (k1, k2) is completed, at least one of the acquisition threads 30-1A and 30-2A unlocks k1 and k2. (Y) The acquisition thread 30 locks two or more target keys specified in the acquired state update request in a determinate order. When the acquisition thread 30 locks all of the two or more target keys, the acquisition thread 30 requests the server program 154 to execute the state update request. For example, when the acquisition thread 30-1A acquires R1 (k1, k2) from the partition 4311-1, the acquisition thread 30-1A locks k1 and k2 in a determinate order and requests the server program 154A to execute R1 (k1, k2). After that, when the acquisition thread 30-2A acquires R1 (k1, k2) from the partition 4311-2, the acquisition thread 30-2A tries to lock k1 and k2, but k1 and k2 are already locked, so that the acquisition thread 30-2A becomes a wait state. When the execution of R1 (k1, k2) is completed, the acquisition thread 30-1A unlocks k1 and k2. Therefore, the acquisition thread 30-2A locks k1 and k2 in a determinate order and then requests the server program 154A to execute R1 (k1, k2). However, the server program 154A skips the execution of R1 (k1, k2) because the server program 154A is configured to identify, from the execution management table 33, that the execution of R1 (k1, k2) has been completed.

Figure 9:
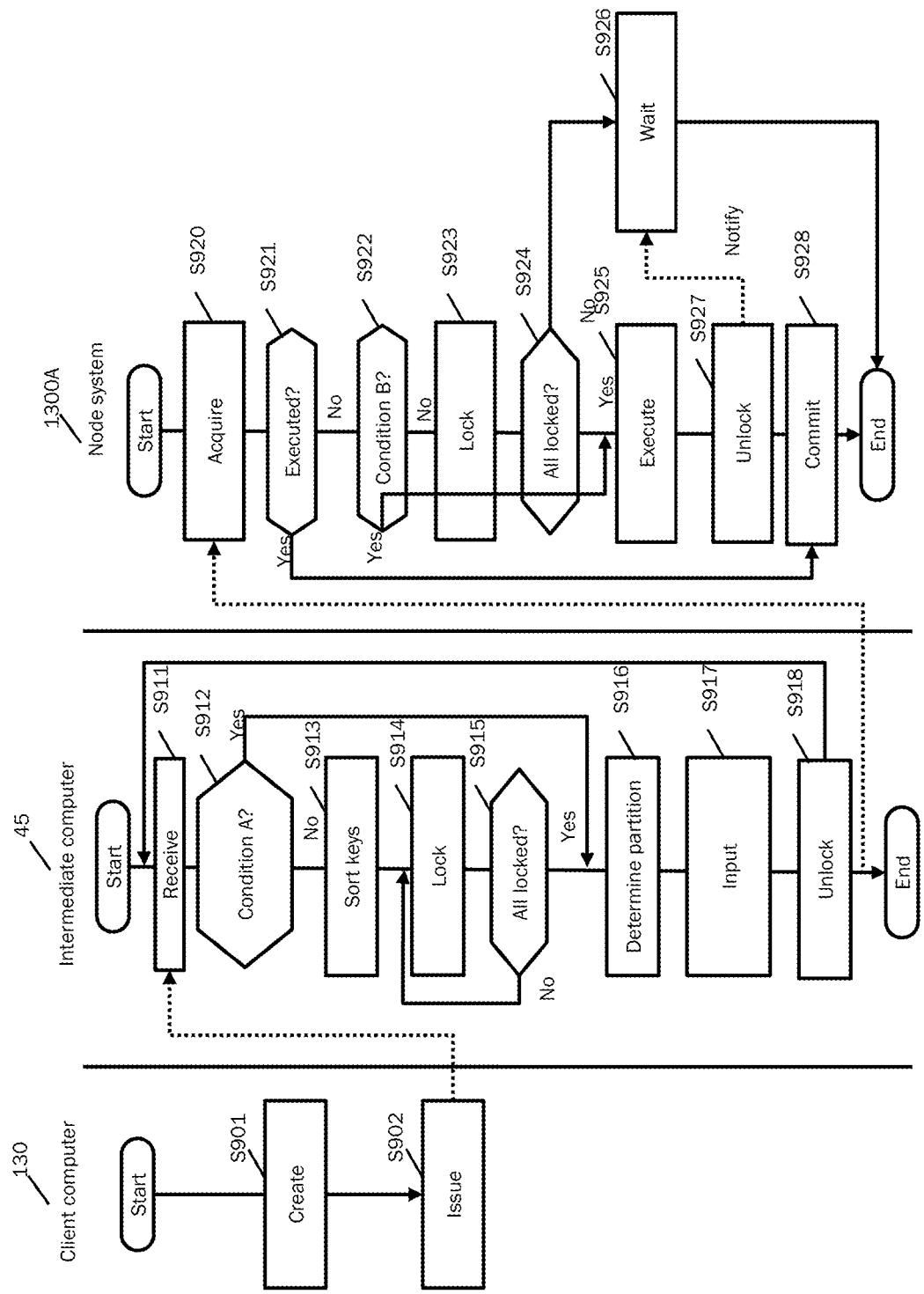
FIG. 9 is a flowchart illustrating a flow from the creation of a state update request to the completion of execution in the second embodiment.

FIG. 9 is a flowchart illustrating a flow from the creation of a state update request to the completion of execution in the second embodiment. Note that, in the description with reference to FIG. 9, the node system 1300A is taken as an example of the node system 1300.

S901 is the same as S701. S902 is the same as S702. S911 is the same as S711.

In S912, the ordering program 454 determines whether or not condition A is satisfied. Condition A is that only one target key is specified in a state update request, or two or more keys specified in a state update request all correspond to the same partition. Note that the target key(s) specified in a state update request is/are identified from the context 70 of the state update request. If the determination result in S912 is true (S912: Yes), it is not necessary to lock the target key(s), so that S913 to S915 are skipped.

If the determination result in S912 is false (S912: No), in S913, the ordering program 454 sorts two or more keys specified in the state update request in a determinate order. In S914, the ordering program 454 locks the two or more target keys in the order of the target keys (i.e., a determinate order). In S915, the ordering program 454 determines whether or not the two or more target keys have all been locked.

If the determination result in S912 is true (S912: Yes), or if the determination result in S915 is true (S915: Yes), in S916, the ordering program 454 determines, for each of the one or more target keys specified in the state update request, the partition 4311 corresponding to that target key. For example, the ordering program 454 determines, for each target key, the partition 4311 from the remainder obtained by dividing the key value of that target key by the number of partitions. As a result, one or more partitions 4311 are determined for one or more target keys.

In S917, the ordering program 454 inputs a state update request to each of the determined one or more partitions 4311.

If there are two or more target keys locked for the state update request, the ordering program 454 unlocks the two or more target keys in S913.

In S920, an acquisition thread 30-1A acquires a state update request from the partition 4311-1. Specifically, the acquisition thread 30-1A, transmits an acquisition request for specifying the partition ID of the partition 4311-1 to the intermediate system 80. The ordering program 454 outputs, to the acquisition thread 30-1A, a state update request to be output of the partition 4311-1 corresponding to the partition ID specified in the acquisition request from the acquisition thread 30-1A.

In S921, the server program 154A (or the acquisition thread 30-A) refers to the execution management table 33 to determine whether or not the acquired state update request has been executed.

If the determination result in S921 is false (S921: No), in S922, the acquisition thread 30-1A determines whether or not condition B is satisfied. Condition B is that only one target key is specified in a state update request, or two or more keys specified in a state update request all correspond to the same partition. Note that the target, key(s) specified in a state update request is/are identified from the context 70 of the state update request. If the determination result in S922 is true (S922: Yes), it is not necessary to lock the target key(s), so that S923 to S924 are skipped.

In S923, the acquisition thread 30-1A locks one or more target keys corresponding to the partition 4311-1 among two or more target keys specified in the state update request. In S924, the acquisition thread 30-1A refers to a lock table 40A to determine whether or not all the target keys have been locked.

If all the target keys are locked (S923: Yes), in S925, the acquisition thread 30-1A requests the server program 154A to execute the state update request, and accordingly, the server program 154A executes the state update request. If two or more target keys are locked for the executed state update request, in S927, the acquisition thread 30-1A unlocks the two or more target keys.

If there is an unlocked target key (S923: No), in S926, the acquisition thread 30-1A waits for all the target keys to be locked and the state update request to be executed. In other words, the acquisition thread 30-1A does not acquire the next state update request from the partition 4311-1 unless the state update request is executed. In this case, the state update request is executed when the same state update request is read from one or more different partitions 4311 and all the target keys are locked. For example, it is assumed that an acquisition thread 30-2A executes S921 to S923 and all the target keys are locked (S924: Yes). Therefore, the acquisition thread 30-2A requests the server program 154A to execute the state update request. If two or more target keys are locked for the executed state update request, in S927, the acquisition thread 30-2A unlocks the two or more target keys. The acquisition thread 30-1A detects the unlocking of the target key locked in S923 and then leaves the wait state. In S928, the acquisition thread 30-2A notifies the intermediate system 80 of the completion of the state update request. In response to that notification, the ordering program 454 updates the ordering table 44 for the node system 1300A (specifically, the ordering program 454 sets an offset representing the position of the state update request as a commit offset).

According to the second embodiment, the ordering system 4211 is divided into a plurality of partitions 4311, and a plurality of state update requests are distributed to the plurality of partitions 4311. Then, in each node system 1300, the plurality of state update requests are acquired in parallel by a plurality of acquisition threads 30 that are different from the plurality of partitions 4311, and the plurality of state update requests are executed in parallel by the server program 154. Therefore, in each node system 1300, a higher degree of parallelism than in the first embodiment can be realized, and therefore, the availability of the node system 1300 is improved as compared with the first embodiment.

Note that, in the second embodiment, according to the example of FIG. 9, if the determination result in S912 is false, the ordering program 454 determines the partition 4311 corresponding to the target key after locking the target key; however, the target key may be locked after the partition 4311 corresponding to the target key is determined. In other words, either the determination of the partition 4311 or the lock of the target key may be performed first as long as the target key is locked before the state update request is input to the partition 4311.

Further, in the second embodiment, instead of the acquisition thread 30 executing S925, S927, and S928 in FIG. 9, a request thread may be created each time a state update request is acquired and it is determined that there is no conflict with respect to the state update request as in the first embodiment. The request thread may execute S925, S927, and S928 in FIG. 9.

Further, in the first and second embodiments, the "execution of the state update request" may include the execution of the state update processing and the execution of the tamper-evidence processing, or may include the execution of the state update processing but the execution of the tamper-evidence processing (i.e., the execution of the state update processing and the execution of the tamper-evidence processing may be separated as will be described in third and fourth embodiments). The "tamper-evidence processing" referred to here may include determining whether or not the asset record (e.g., the latest asset record (terminal asset record)) or its HV is the same between two or more node systems 1300 for the same state update request. Further, the "tamper-evidence processing" may include, for example, verifying, by the server program 154A, the HV of the asset record (e.g., the latest asset record) corresponding to the target key specified in the state update request by using an earlier asset record.

Further, in at least one of the first and second embodiments, the client program 134 of each client system 13 may have the function of the ordering program 454, instead of the intermediate system 80.

Further, in at least one of the first and second embodiments, instead of the server program 154 capable of executing a plurality of state update requests in parallel, a plurality of threads for executing a state update request (hereinafter each referred to as an execution thread) may be provided so that the plurality of execution threads can execute a plurality of state update requests in parallel. The plurality of execution threads may be prepared in advance or may be dynamically created.

Further, in the first and second embodiments, a context addition unit is included in the client program 134 (an example of the request issuing unit). Since the client program 134 receives one or more target keys being specified from the user program 124, the client program 134 can add the context 70 to the state update request without temporarily executing the state update request. In at least one of the first and second embodiments, the context addition unit may be a function not included in the client program 134. In this case, the context addition unit may identify one or more target keys specified in the state update request by temporarily executing the state update request, create the context 70, which is a description for identifying the identified one or more target keys, and add the created context 70 to the state update request. The context addition unit may be included in the client system 13 (an example of the first computer system), the intermediate system 80, the server system 15 (an example of the second computer system), and/or a system other than those systems 13, 80 and 15. In Other words, in the first and second embodiments, the context 70 may be added at any stage until the state update request is executed. Specifically, in the first embodiment, adding the context 70 to the state update request may be executed regardless of before the state update request goes into a queue or after the state update request leaves the queue. In the second embodiment, the context 70 may be added to the state update request before the state update request is input to the partition. As a method of adding the context 70, any of the following methods may be adopted.

In at least one of the first and second embodiments, the client program 134 may receive one or more target keys being specified from the user program 124, and add the context 70 to the state update request to be transmitted by the client program 134.

In at least one of the first and second embodiments, the ordering program 454 may identify one or more target keys by temporarily executing the state update request when the state update request is input to the ordering system 4211 or when the state update request is output from the ordering system 4211, and add the context 70, which is a description for identifying the identified one or more target keys, to the state update request.

In the first embodiment, the acquisition thread 30 may identify one or more target keys by temporarily executing the state update request output from the ordering system 4211, add the context 70, which is a description for identifying the identified one or more target keys, to the state update request, and pass to the server program 154 the state update request with the context 70 being added.

In at least one of the first and second embodiments, the node system 1300 (e.g., the acquisition thread 30) may identify one or more target keys by temporarily executing the state update request from the client program 134, add the context 70, which is a description for identifying the identified one or more target keys, to the state update request, and transmit to the client program 134 the state update request with the context 70 being added. The client program 134 may transmit the state update request to the ordering program 454.

The first and second embodiments may be summarized as follows, for example.

A data management system includes one or more context addition units and one or more conflict determination units. One or more first computer systems include one or more request issuing units. A plurality of node systems of a second computer system that communicates with one or more first computer systems include a plurality of request execution units. The request issuing unit in the first computer system issues a state update request. The state update request is input to an ordering system. The state update request includes an argument group including one or more arguments, and a processing content that is a description representing the content of state update processing using the argument group or a link to the description. The state update processing is processing of updating, for each of one or more targets, an object that is data representing a state of the target. The ordering system is composed of one or more partitions, and is a system that guarantees total ordering for each partition. The context addition unit adds a context that is a description for identifying one or more targets to a state update request. For each node system, each time a state update request is output from the ordering system, the conflict determination unit identifies one or more targets from the context of the state update request, and performs a conflict determination for determining whether or not the identified one or more targets conflict with one or more targets specified in one or more state update requests being executed in the node system. When the result of the conflict determination is that there is no conflict, the request execution unit in the node system executes the state update request.

For the state update request output from the ordering system, the conflict determination unit may lock one or more targets identified from the context of the state update request. When all of the one or more targets are locked, the result of the conflict determination may be a result indicating that there is no conflict.

In a case where the ordering system is composed of the plurality of partitions (hereinafter, multi-partition case), each state update request may be input to one or more partitions corresponding to the one or more targets identified from the context of the state update request. Each conflict determination unit may identify one or more targets from the context of a state update request output from a partition corresponding to the conflict determination unit.

In the multi-partition case, for a state update request output from a partition, when there are two or more identified targets and the two or more targets correspond to two or more partitions including the partition, the conflict determination unit corresponding to the partition may lock at least a target corresponding to the partition among the two or more targets. When all of the two or more targets are locked, the result of the conflict determination may be a result indicating that there is no conflict.

In the multi-partition case, for a state update request output from a partition, when there is only one identified target, or when two or more identified targets all correspond to one partition, the state update request may be executed without the conflict determination being performed for the state update request.

In the multi-partition case, each of the one or more request issuing units, or an ordering management unit included in a computer system including the ordering system may perform the following.

One or more targets are identified from the context of a state update request.

When there are two or more identified targets and the two or more targets correspond to two or more partitions, the two or more targets are locked in a determinate order.

When all of the two or more targets are locked, the state update request is input to each of the two or more partitions.

The two or more targets are all unlocked.

In the multi-partition case, each of the one or more request issuing units, or an ordering management unit included in a computer system including the ordering system may perform the following.

One or more targets are identified from the context of a state update request.

When there is only one identified target, or when two or more identified targets all correspond to one partition, the state update request is input to the partition without the identified one or more targets being locked.

The one or more request issuing units may include the one or more context addition units.

The context addition unit may identify one or more targets specified in the state update request by temporarily executing the state update request. The context addition unit may create a context that is a description for identifying the identified one or more targets, and add the created context to the state update request.

Third Embodiment

Hereinafter, a third embodiment will be described. In the following description, differences from the first and second embodiments will be mainly focused, and the description of the common points with the first and second embodiments will be simplified or omitted.

Figure 10:
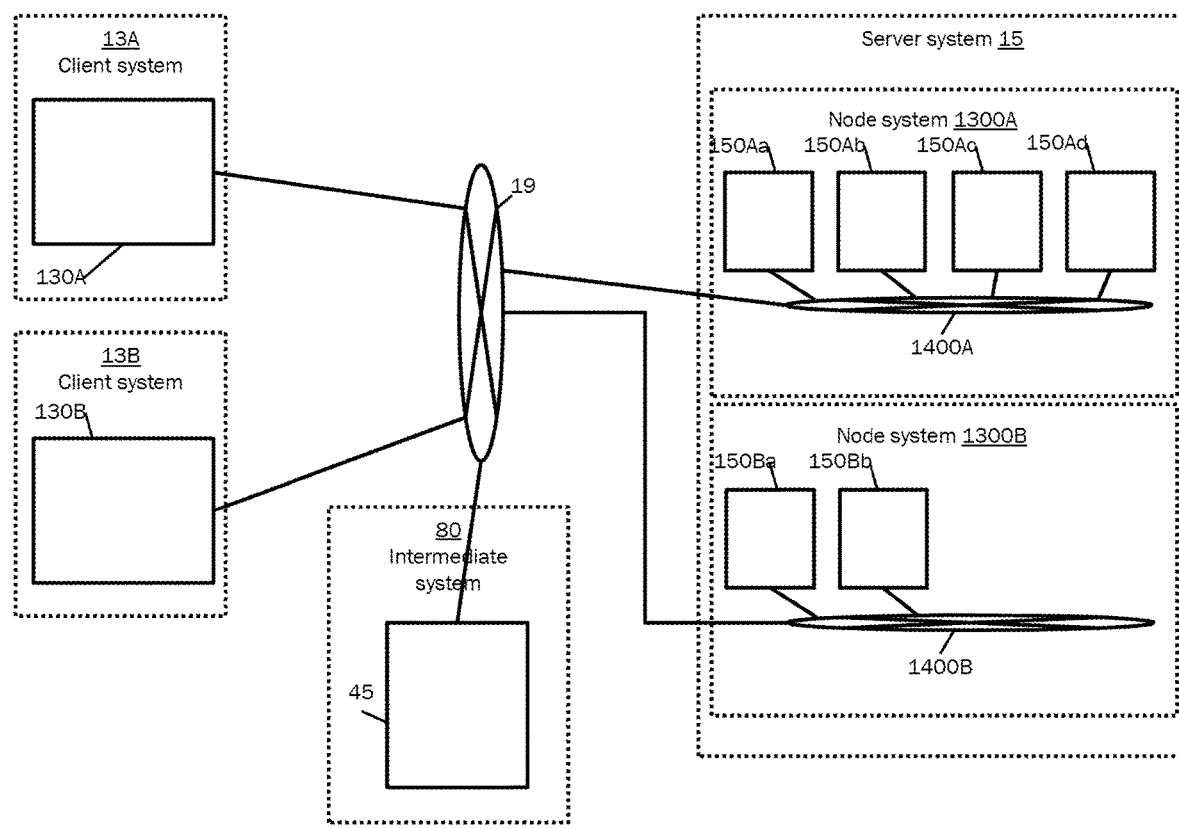
FIG. 10 illustrates an example of the configuration of the entire system according to a third embodiment.

FIG. 10 illustrates an example of the configuration of the entire system according to the third embodiment.

In the server system 15, the processing speed (e.g., configuration and performance) may be different between the node systems 1300. For example, the node system 1300A is composed of four server computers 150Aa, 150Ab, 150Ac, and 150Ad connected to a communication network 1400A. The node system 1300B is composed of two server computers 150Ba and 150Bb connected to a communication network 1400B. If all the server computers 150 illustrated in FIG. 10 have the same processing speed, the processing speed of the node system 1300B is lower than the processing speed of the node system 1300A. As in this case, the processing speeds of the plurality of node systems 1300 may be different. In the example of FIG. 10, each communication network 1400 is connected to the communication network 19, but at least one of the communication networks 1400 may be integrated with the communication network 19.

As described above, each node system 1300 may be configured without considering the processing speeds of the other node systems 1300.

According to a general data management system to which a BFT (Byzantine Fault Tolerance) consensus algorithm or a similar mechanism such as blockchains is applied, a plurality of node systems in a server system each manage, for each target, an object (data representing a state of the target). Each time the server system receives a state update request from a client system, each node system executes tamper-evidence processing of detecting whether or not an object is tampered with. In each node system, the "tamper-evidence processing" includes at least one of: detecting whether or not the current object (before the state update processing is executed) is tampered with; and detecting whether or not an updated object obtained by executing the state update processing halfway is tampered with. Similar tamper-evidence processing is executed in the plurality of node systems. If the execution of the tamper-evidence processing is not completed for all the node systems, none of the node systems can execute the state update processing. Further, even if any of the node systems successfully completes the execution of the state update processing first, none of the node systems can execute the state update processing for a next state update request related to the instant state update request unless all the node systems complete the execution of the state update processing. This is because all the node systems do not always have an updated object, and therefore, all the node systems may not complete the execution of the tamper-evidence processing for the next state update request. Thus, it is desirable that the plurality of node systems have the same processing speed. This is because if the processing speeds of the plurality of node systems are different, it becomes necessary to wait for processing results from node systems having a relatively low processing speed, resulting in reduced availability of the entire system.

By contrast, in the third embodiment as will be described in detail later, the execution of the state update processing and the execution of the tamper-evidence processing of comparing the asset records of two or more node systems 1300 or their summaries are separated. Specifically, the data management system includes one or more tamper-evidence execution units in addition to the plurality of request execution units included in the plurality of node systems 1300. The tamper-evidence execution unit executes the tamper-evidence processing. In each node system 1300, the request execution unit executes the state update processing for each state update request, and returns a response indicative of the completion of the state update request without executing the tamper-evidence processing. Accordingly, it is not necessary that the processing speeds of all the node systems 1300 in the server system 15 are the same. Therefore, it is possible to increase the flexibility of the configuration of the server system 15, and as a result, also to enhance the scalability with high efficiency.

Further, since the execution of the state update processing and the execution of the tamper-evidence processing are separated, the state update processing is executed independently in each node system 1300. When a response indicative of the completion of the state update processing is returned from at least one of the node systems 1300, the client system 13 can transmit a next related state update request. For the next state update request, the state update processing is also executed independently in each node system 1300. Thus, the latency of the state update request is high for the client system 13.

In the present embodiment, the tamper-evidence execution unit is included in the client program 134. However, the tamper-evidence execution unit may be a function realized by executing a program different from the client program 134 in the client system 13, or may be included in a system other than the client system 13, for example, an audit system (a computer system that plays a role of audit). At least one of any of the client systems 13, any of the node systems 1300, or the intermediate system 80 may also serve as the audit system.

Figure 11:
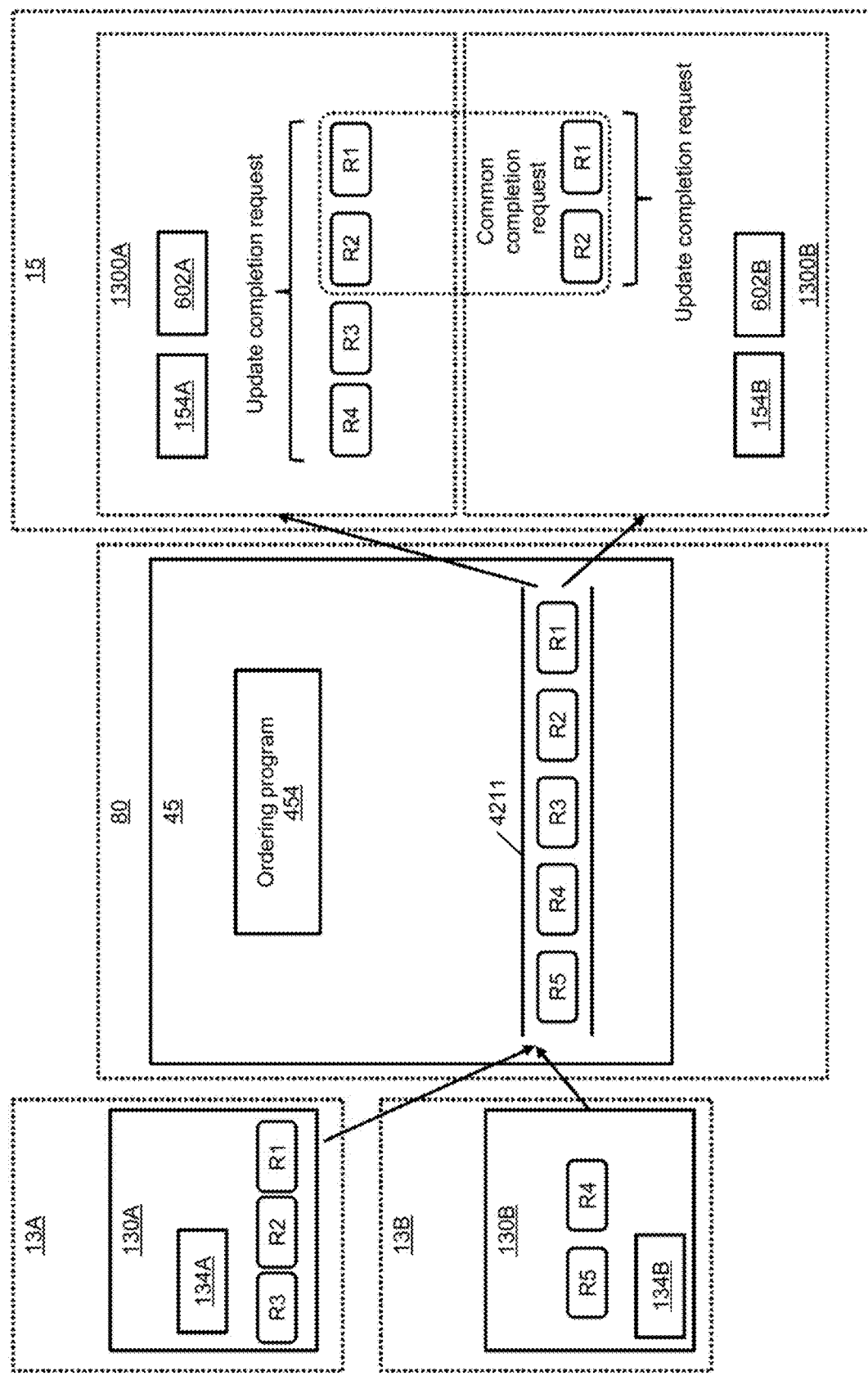
FIG. 11 illustrates an example of the outline of the third embodiment.

FIG. 11 illustrates an example of the outline of the third embodiment. Note that, in FIG. 11, "Rx" (x is a natural number) represents a state update request.

A state update request issued from the client program 154 is input to the ordering system 4211 and is then output from the ordering system 4211 to each of the plurality of node systems 1300. In each node system 1300, the server program 154 executes the state update processing (e.g., adds a terminal asset record to the asset of a specified target) as the execution of the state update request, and returns a response indicative of the completion of the state update request to the client program 134 without executing the tamper-evidence processing. The client program 154 that has issued the state update request recognizes that the state update is completed when the client program 154 receives the response of the completion of the request from at least one node system 1300.

As described above, in the present embodiment, it is not necessary to execute the tamper-evidence processing of comparing the asset records or their summaries in two or more node systems 1300 to complete the execution of the state update request. Thus, although the state update request is transmitted to all the node systems 1300, the number of update completion requests (state update requests for which the execution of the state update processing is completed) is not necessarily the same among the node systems 1300. In the example of FIG. 11, of R1 to R5 entered in the ordering system 4211, the update completion requests in the node system 1300A are R1 to R4, while the update completion requests in the node system 1300B are only R1 and R2.

The client program 134 executes the tamper-evidence processing for a common completion request among one or more update completion requests. The common completion request is an update completion request that is common among two or more node systems 1300 of the plurality of node systems 1300. In the example of FIG. 11, the common completion requests in the node systems 1300A and 1300B are R1 and R2. The client program 134 executes the tamper-evidence processing for at least one of the common completion requests.

It is believed that, depending on the requirements of a data management system application, the tamper-evidence processing does not necessarily have to be executed immediately each time a state update request is received, and/or it is not necessary to execute the tamper-evidence processing for all state update requests. For example, for an application where the target is an account and the state of the target is a balance, the balance changes at both deposits and withdrawals, and however, depending on the requirements of the application, the tamper-evidence processing for the balance may have only to be executed for withdrawals without having been executed for deposits. In the present embodiment, since the execution of the state update processing and the execution of the tamper-evidence processing are separated, the timing of the execution of the tamper-evidence processing can be flexibly determined, and/or a common completion request for which the tamper-evidence processing is to be executed can be flexibility selected. For example, the execution frequency of the tamper-evidence processing may be less than the issuance frequency of the state update request, or for each target, the common completion request to be subjected to the tamper-evidence processing may be narrowed down to a specific common completion request (e.g., the latest common completion request) of one or more common completion requests.

Note that the tamper-evidence processing may be executed for M node systems 1300 (M is an integer of 2 or more and N or less) among N node systems 1300 (N is an integer of 2 or more and is also the number of node systems 1300 constituting the server system 15). In other words, it does not necessarily have to be M=N. In the following description, for the sake of simplicity, M=N.

Further, in the present embodiment, for each target, the asset 810 (see FIG. 4) is adopted as an example of a history of states resulting from the execution of a state update request for which the target is specified.

The details of processing executed in the third embodiment will be described below with reference to FIGS. 12 to 13. Note that, hereinafter, in the description of the third embodiment, for the sake of simplicity, it is assumed that the N node systems 1300 constituting the server system 15 are the node systems 1300A and 1300B.

Figure 12:
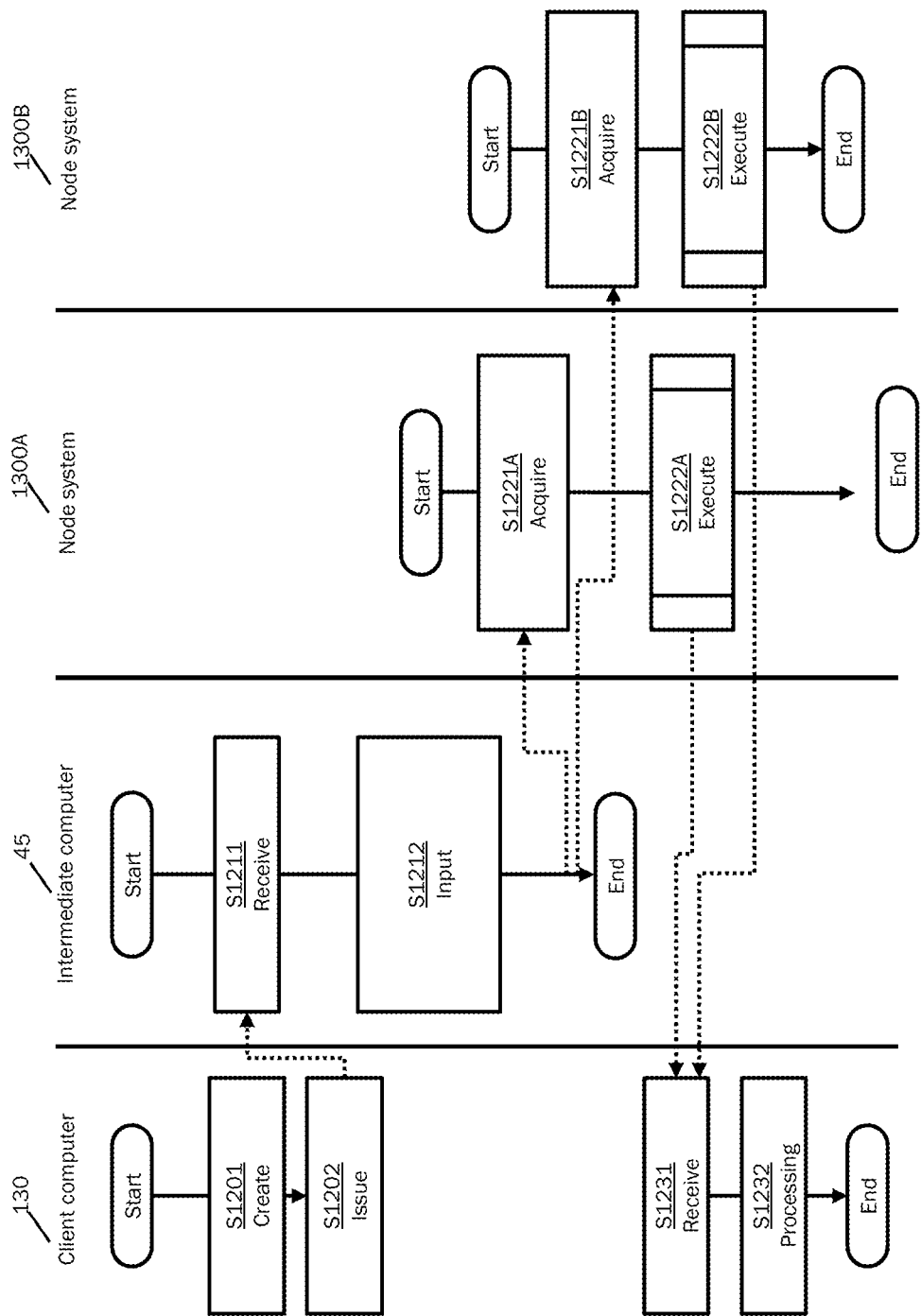
FIG. 12 is a flowchart illustrating a flow from the creation of a state update request to the completion of execution in the third embodiment.

FIG. 12 is a flowchart illustrating a flow from the creation of a state update request to the completion of execution in the third embodiment.

In S1201, the client program 134 creates a state update request. The state update request includes, for example, key, Sig, nonce, and so on. A context 70 may be added to the state update request. In S1202, the client program 134 issues the state update request.

In S1211, the ordering program 454 receives the state update request. In S1212, the ordering program 454 inputs the received state update request to the ordering system 4211.

By taking the node system 1300A as an example, S1221 and S1222 will be described. In S1221A, a server program 154A acquires a state update request from the ordering system 4211. In S1222A, the server program 154A executes the state update request. Specifically, in S1222A, the server program 154A executes the state update processing, but does not execute the tamper-evidence processing. S1222A may be S721 to S724 and S731 to S733 of the first embodiment (see FIG. 7). Further, S1222A may be S921 to S928 of the second embodiment (see FIG. 9).

For each of the node systems 1300A and 1300B, a response to the state update request (e.g., a completion response) is returned to the client program 134 each time the state update request is completed. It may be determined in advance which of the node systems 1300A and 1300B is the main node system, and only the main node system may return a response to the state update request to the client program 134 (the node system other than the main node system does not have to return a response to the state update request to the client program 134 even when the state update request is completed). Hereinafter, in the description of FIG. 12, one state update request will be taken as an example ("a state update request of interest" in the description of FIG. 12).

In S1231, the client program 134 receives the response to the state update request of interest issued by the client program 134.

In S1232, the client program 134 executes some processing with respect to the received response. For example, if the received response is a response first received for the state update request of interest, the client program 134 interprets the result of the state update request of interest from that response. On the other hand, if the response is a response received after a response to the state update request of interest is received, the client program 134 discards that received response. In other words, the response first received is valid for the state update request of interest. Note that the client program 134 may store the received response for a certain period of time without discarding it, and compare it with a response from another node system 1300.

Figure 13:
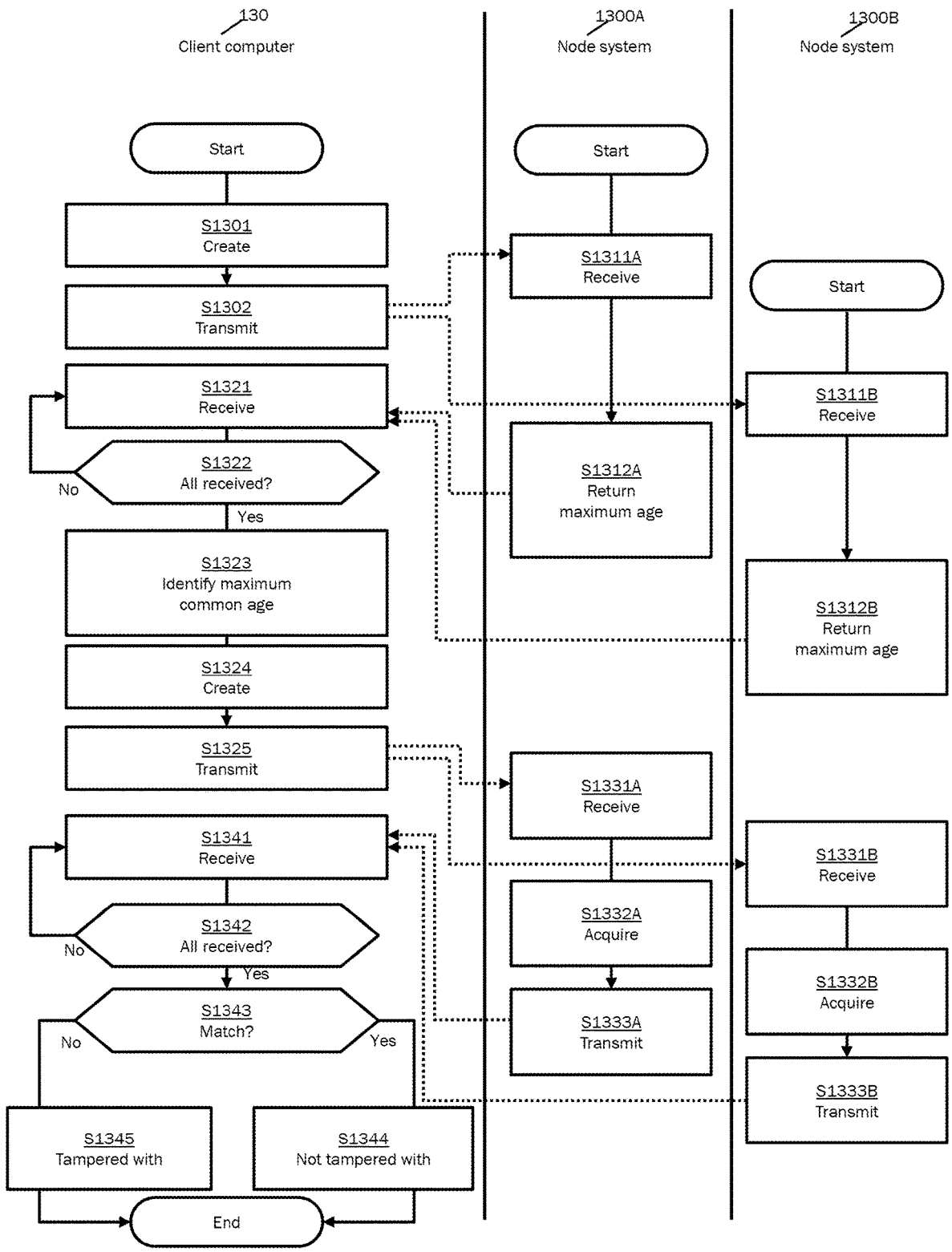
FIG. 13 is a flowchart of execution of tamper-evidence processing.

FIG. 13 is a flowchart of execution of the tamper-evidence processing.

In S1301, the client program 134 creates a query for age. In the query for age, at least one target key is specified. Hereinafter, for the sake of simplicity, it is assumed that one target key ("key of interest" in the description of FIG. 13) is specified for one query for age. The query for age is a query for the maximum age of the key of interest. In S1302, the client program 134 transmits the query for age. The query for age is transmitted to each of the node systems 1300A and 1300B via or not via the intermediate system 80.

By taking the node system 1300A as an example, S1311 and S1312 will be described. In S1311A, the server program 154A in the node system 1300A receives the query for age. In S1312A, the server program 154A acquires the maximum age of the key of interest (age in the terminal asset record of the key of interest) specified in the query for age, for example, in a linearizable manner, and returns a response indicative of the maximum age to the source of the query for age. Note that, before S1312A, the server program 154A may execute the tamper-evidence processing for each of the asset records constituting the asset 810 corresponding to the key of interest.

In S1321, the client program 134 receives the maximum age. In S1322, the client program 134 determines whether or not the maximum age has been received from all of the node systems 1300A and 1300B. If the determination result in S1322 is false (S1322: No), the client program 134 waits for receiving the maximum age from all of the node systems 1300A and 1300B.

If the determination result in S1322 is true (S1322: Yes), in S1323, the client program 134 identifies the maximum common age (in other words, the minimum value in the received maximum ages) in the received maximum ages. For example, if the latest age from the node system 1300A is "8" and the latest age from the node system 1300B is "6", the maximum common age is "6". In S1324, the client program 134 creates a query for record in which the above-mentioned key of interest and the maximum common age identified in S1322 are specified. In S1325, the client program 134 transmits the query for record. The query for record is transmitted to each of the node systems 1300A and 1300B via or not via the intermediate system 30.

By taking the node system 1300A as an example, S1331 to S1333 will be described. In S1331A, the server program 154A in the node system 1300A receives the query for record. In S1332A, the server program 154A acquires an asset record having the key of interest and the maximum common age, which are specified in the query for record or its summary (e.g., HV), for example, in a linearizable manner. In S1333A, the server program 154A returns a response indicative of the asset record or its summary to the transmission source of the inquiry of record.

In S1341, the client program 134 receives the asset record having the key of interest and the maximum common age or its summary. In S1342, the client program 134 determines whether or not the asset record having the key of interest and the maximum common age or its summary has been received from all of the node systems 1300A and 1300B. If the determination result in S1342 is false (S1342: No), the client program 134 waits for receiving the asset record or its summary from all of the node systems 1300A and 1300B.

If the determination result in S1342 is true (S1342: Yes), in S1343, the client program 134 determines whether or not all the received asset records or their summaries match. If the determination result in S1343 is true (S1343: Yes), in S1344, the client program 134 determines that it is not tampered with. If the determination result in S1343 is false (S1343: No), in S1345, the client program 134 determines that it is tampered with.

The above description is of the execution of the tamper-evidence processing.

In the execution of the tamper-evidence processing, the timing of creating and transmitting a query for age can be flexibly set according to the requirements of an application or other factors.

Further, in the execution of the tamper-evidence processing, the common age for which whether or not it is tampered with is detected can also be flexibly set according to the requirements of an application or other factors. For example, one or more common ages for which whether or not they are tampered with is detected may be only the maximum common age, may be the maximum common age and all common ages lower (earlier) than the maximum common age, or may be any one or more of the maximum common age and common ages lower than the maximum common age.

Fourth Embodiment

Hereinafter, a fourth embodiment will be described. In the following description, differences from the third embodiment will be mainly focused, and the description of the common points with the third embodiment will be simplified or omitted.

In the third embodiment, the client program 134 transmits a query for age to each node system 1300, receives a response indicative of the maximum age from each node system 1300, and identifies the maximum common age. After that, the client program 134 transmits a query for record in which the identified maximum common age is specified to each node system 1300, and receives an asset record having the maximum common age or its summary from each node system 1300. In other words, a two-step exchange is performed between the client program 134 and each node system 1300.

In the fourth embodiment, the exchange between the client program 134 and each node system 1300 is one step.

Figure 14:
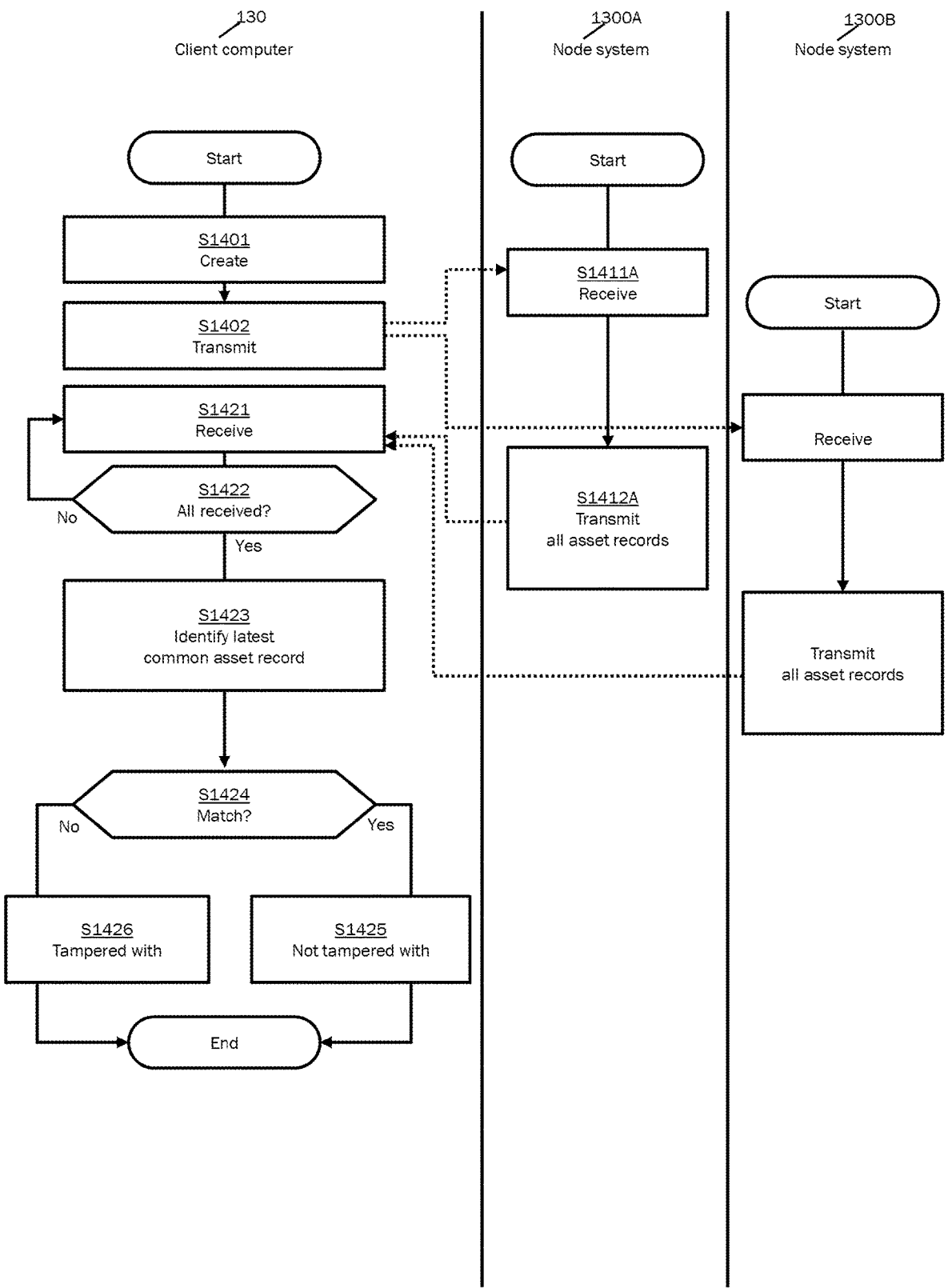
FIG. 14 is a flowchart of execution of tamper-evidence processing according to a fourth embodiment.

FIG. 14 is a flowchart of execution of the tamper-evidence processing according to the fourth embodiment.

In S1401, the client program 134 creates a query for record. In the query for record created in S1401, at least one target key is specified. Hereinafter, for the sake of simplicity, it is assumed that one target key ("key of interest" in the description of FIG. 14) is specified for one query for record. The query for record created in S1401 is a query for all asset records of the key of interest. In S1402, the client program 134 transmits the query for record. The query for record is transmitted to each of the node systems 1300A and 1300B via or not via the intermediate system 80.

By taking the node system 1300A as an example, S1411 and S1412 will be described. In S1411A, the server program 154A in the node system 1300A receives the query for record. In S1412A, the server program 154A acquires all the asset records (asset 810) of the key of interest specified in the query for record, for example, in a linearizable manner, and returns a response indicative of all the asset records (or all asset record summaries and all ages (ages of all the asset records) corresponding to all the asset records) to the transmission source of the query for record. Note that, before S1412A, the server program 154A may execute the tamper-evidence processing for each of the asset records constituting the asset 810 corresponding to the key of interest.

In S1421, the client program 134 receives all the asset records (or all asset record summaries and all ages) from at least one of the node systems 1300. In S1422, the client program 134 determines whether or not all the asset records (or all asset record summaries and all ages) have been received from all of the node systems 1300A and 1300B. If the determination result in S1422 is false (S1422: No), the client program 134 waits for all the asset records (or all asset record summaries and all ages) to be received from all of the node systems 1300A and 1300B.

If the determination result in S1422 is true (S1422: Yes), in S1423, the client program 134 identifies the maximum common age from all the asset records (or all asset record summaries and all ages) of the node systems 1300A and 1300B, and then identifies the latest common asset record (or the latest common asset record summary, which is a summary of the common asset record), which is a common asset record including the identified maximum common age. The "common asset record" is an asset record that corresponds to a common completion request (in other words, a common age) (a "common asset record summary" is a summary of the common asset record).

In S1424, the client program 134 determines whether or not the identified latest common asset record (or the latest common asset record summary) matches between the node systems 1300A and 1300B. If the determination result in S1424 is true (S1424: Yes), in S1425, the client program 134 determines that it is not tampered with. For the asset record for which the determination result in S1424 is false (S1424: No), in S1426, the client program 134 determines that it is tempered with.

The above is an example of the tamper-evidence processing according to the fourth embodiment.

Note that, in the description of FIG. 14, for each node system 1300, the "all the asset records" corresponding to the key of interest do not necessarily have to be all asset records as the asset 810 itself. For example, in the query for record created in S1401, a record condition may be specified for the key of interest. The "record condition" may be, for example, a condition relating to the date and time when an asset record was added. In this case, the "all the asset records" may be all asset records that meet the specified record condition.

Further, in S1423, instead of the latest common asset record (or the latest common asset record summary), all the common asset records (or all the common asset record summaries) may be identified, or some common asset records including or excluding the latest common asset record (or some common asset record summaries including or excluding the latest common asset record summary) may be identified.

Further, the client program 134 may select which of the tamper-evidence processing according to the third embodiment and the tamper-evidence processing according to the fourth embodiment is to be executed, in accordance with the communication status and/or other status of the client system 130.

The third and fourth embodiments may be summarized as follows, for example.

A data management system includes one or more tamper-evidence execution units and a plurality of request execution units included in a plurality of node systems of a second computer system that communicates with one or more first computer systems. A request issuing unit included in the first computer system issues a state update request in which a target is specified. In each of the node systems, the request execution unit executes, for each state update request, state update processing of updating an object that is data representing a state of the specified target, and returns a response indicative of completion of the state update request without executing tamper-evidence processing. The tamper-evidence execution unit executes tamper-evidence processing of detecting whether or not each of one or more common completion requests of one or more update completion requests is tampered with by comparing updated objects of the plurality of node systems or summaries thereof. The update completion request is a state update request for which the execution of the state update processing has been completed. The common completion request is an update completion request that is common among two or more node systems of the plurality of node systems.

In each node system, the object representing the state of the specified target may include data representing a generation of the state. The tamper-evidence execution unit may execute the following with respect to the specified target.

The tamper-evidence execution unit receives latest-generation information representing the latest generation of the state of the target from each of the plurality of node systems.

The tamper-evidence execution unit identifies the latest common generation from the latest generation information of the plurality of node systems.

The tamper-evidence execution unit specifies one or more common generations of one or more common generations including the identified latest common generation for each of the two or more node systems.

The tamper-evidence execution unit receives, for each of the one or more common generations, an updated object of a common completion request corresponding to the common generation or a summary thereof from each of the two or more node systems.

Further, the tamper-evidence execution unit may execute the following with respect to the specified target.

The tamper-evidence execution unit receives all updated objects or all updated object summaries for the target from each of the plurality of node systems. The updated object summary is a summary of the updated object.

The tamper-evidence execution unit identifies, from all updated objects or all updated object summaries of the plurality of node systems, at least one common updated object or at least one common updated object summary of the plurality of node systems. The common updated object is an updated object corresponding to the common completion request. The common updated object summary is a summary of the common updated object.

The tamper-evidence execution unit detects whether or not the common updated object or the summary thereof is tampered with by comparing the common updated objects of the plurality of node systems or the summaries thereof.

The data management system according to at least one of the third and fourth embodiments may or may not have a function (e.g., the context addition unit and the conflict determination unit) of the data management system according to at least one of the first and second embodiments. Further, in at least one of the third and fourth embodiments, the ordering system may be composed of one partition or a plurality of partitions.

While some embodiments have been described above, such embodiments are examples for describing the present invention and are not intended to limit the scope of the present invention to the embodiments. The present invention can be implemented even in various other forms.

For example, the asset set 800 may be a plurality of transactions having a DAG structure such as UTXO (Unspent Transaction Output) (each transaction includes one or more inputs and one or more outputs). In other words, an object to be a node may be a transaction, and a relationship represented by an edge may be a relationship between transactions.

Further, for example, an electronic signature using a user's private key may not be created for at least one of a processing logic, Arg, and nonce. Thus, for example, at least one of BL, nonce, and Sig may not be associated with a request issued by client program 134.

Further, for example, in each node system 1300, the addition (writing) or acquisition (reading) of an asset record may be performed in a linearizable and/or serializable manner.

REFERENCE SIGNS LIST

13 Client system
15 Server system
30 Intermediate system
1300 Node system

The invention claimed is:

1. A data management system comprising:
one or a plurality of tamper-evidence execution units; and
a plurality of request execution units included in a plurality of node systems of a second computer system that communicates with one or a plurality of first computer systems,
wherein a request issuing unit included in the one or the plurality of the first computer systems issues a state update request in which a target is specified,
in each node system, for each state update request, the request execution unit:
executes state update processing of updating an object that is data representing a state of the target specified in the state update request, and
returns a response indicative of completion of the state update request without executing tamper-evidence processing,
the one or a plurality of tamper-evidence execution units executes tamper-evidence processing of detecting whether, for each of one or more common completion requests of one or a plurality of update completion requests, the updated object is tampered with by comparing updated objects of the plurality of node systems or by comparing summaries thereof,
each of the one or a plurality of update completion requests is a state update request for which the execution of the state update processing has been completed, and
each of the one or more common completion requests is an update completion request that is common among two or more node systems of the plurality of node systems,
wherein in each node system, an object representing the state of the target specified includes data representing a generation of the state of the target specified, and
wherein the one or a plurality of tamper-evidence execution units executes, for the specified target:
receiving latest-generation information representing the latest generation of the state or the target from each of the plurality of node systems;
identifying a latest common generation from a latest generation information of the plurality of node systems;
specifying one or more common generations of one or a plurality of common generations including the identified latest common generation as each of the two or more node systems; and
receiving, for each of the one or more common generations, an updated object of a common completion request corresponding to the common generation or a summary thereof from each of the two or more node systems.

2. The data management system according to claim 1, wherein in each node system, an object representing the state of the specified target, includes data representing a generation of the state of the specified target, and
wherein at least one common updated object is a common updated object of a latest common generation, or at least one common updated object summary is a common updated object summary of the latest common generation.

3. A data management system comprising:
one or a plurality of tamper-evidence execution units; and
a plurality of request execution units included in a plurality of node systems of a second computer system that communicates with one or a plurality of first computer systems,
wherein a request issuing unit included in the one or the plurality of the first computer systems issues a state update request in which a target is specified,
in each node system, for each state update request, the request execution unit:
executes state update processing of updating an object that is data representing a state of the target specified in the state update request, and
returns a response indicative of completion of the state update request without executing tamper-evidence processing,
the one or a plurality of tamper-evidence execution units executes tamper-evidence processing of detecting whether, for each of one or more common completion requests of one or a plurality of update completion requests, the updated object is tampered with by comparing updated objects of the plurality of node systems or by comparing summaries thereof, each of the one or a plurality of update completion requests is a state update request for which the execution of the state update processing has been completed, and each of the one or more common completion requests is an update completion request that is common among two or more node systems of the plurality of node systems, and wherein the one or a plurality of tamper-evidence execution units executes, for the target specified:

receiving all updated objects or all updated object summaries for the target from each of the plurality of node systems,
the updated object summaries including a summary of the updated object;

identifying, from all updated objects or all updated object summaries of the plurality of node systems, at least one common updated object or at least one common updated object summary of the plurality of node systems,
the common updated object being an updated object corresponding to the common completion request,
the at least one common updated object summary being a summary of a common updated object; and detecting whether the common updated object is tampered with by comparing common updated objects of the plurality of node systems or the summaries thereof.

4. The data management system according to claim 3, wherein in each node system, an object representing the state of the specified target, includes data representing a generation of the state of the specified target, and wherein the at least one common updated object is a common updated object of a latest common generation, or the at least one common updated object summary is a common updated object summary of the latest common generation.

5. A data management method comprising:

in each of a plurality of node systems of a second computer system that communicates with one or a plurality of first computer systems, for each state update request which is issued by the one or the plurality of the first computer systems and in which a target is specified,
executing state update processing of updating an object that is data representing a state of the target specified in the state update request;
returning a response indicative of completion of the state update request without executing tamper-evidence processing; and executing tamper-evidence processing of detecting whether, for each of one or more common completion requests of one or a plurality of update completion requests, the updated object is tampered with by comparing updated objects of the plurality of node systems or summaries thereof, each of the one or a plurality of update completion requests including a state update request for which the execution of the state update processing has been completed, and each of the one or more common completion requests being an update completion request that is common among two or more node systems of the plurality of node systems, wherein in each node system, an object representing the state of the target specified includes data representing a generation of the state of the target specified, and wherein tamper-evidence execution for the specified target includes:

receiving latest-generation information representing the latest generation of the state or the target from each of the plurality of node systems;

identifying a latest common generation from a latest generation information of the plurality of node systems;

specifying one or more common generations of one or a plurality of common generations including the identified latest common generation as each of the two or more node systems; and receiving, for each of the one or more common generations, an updated object of a common completion request corresponding to the common generation or a summary thereof from each of the two or more node systems.

6. A data management method comprising:

in each of a plurality of node systems of a second computer system that communicates with one or a plurality of first computer systems, for each state update request which is issued by the one or the plurality of the first computer systems and in which a target is specified,
executing state update processing of updating an object that is data representing a state of the target specified in the state update request;
returning a response indicative of completion of the state update request without executing tamper-evidence processing; and executing tamper-evidence processing of detecting whether, for each of one or more common completion requests of one or a plurality of update completion requests, the updated object is tampered with by comparing updated objects of the plurality of node systems or summaries thereof, each of the one or a plurality of update completion requests including a state update request for which the execution of the state update processing has been completed, and each of the one or more common completion requests being an update completion request that is common among two or more node systems of the plurality of node systems, wherein the one or a plurality of tamper-evidence execution units executes, for the target specified, receiving all updated objects or all updated object summaries for the target from each of the plurality of node systems,
the updated object summaries including a summary of the updated object;

identifying, from all updated objects or all updated object summaries of the plurality of node systems, at least one common updated object or at least one common updated object summary of the plurality of node systems,
the common updated object being an updated object corresponding to the common completion request,
the at least one common updated object summary being a summary of a common updated object; and detecting whether the common updated object is tampered with by comparing common updated objects of the plurality of node systems or the summaries thereof.

* * * * *